United States Patent
Zhang et al.

(10) Patent No.: US 12,284,012 B2
(45) Date of Patent: Apr. 22, 2025

(54) RADIAL MODES FOR OAM MIMO COMMUNICATION

(71) Applicant: QUALCOMM Incorporated, San Diego, CA (US)

(72) Inventors: Danlu Zhang, San Diego, CA (US); Min Huang, Beijing (CN); Yu Zhang, San Diego, CA (US); Hao Xu, Beijing (CN)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 18/286,956

(22) PCT Filed: Jun. 17, 2021

(86) PCT No.: PCT/CN2021/100510
§ 371 (c)(1),
(2) Date: Oct. 13, 2023

(87) PCT Pub. No.: WO2022/261883
PCT Pub. Date: Dec. 22, 2022

(65) Prior Publication Data
US 2024/0204833 A1 Jun. 20, 2024

(51) Int. Cl.
*H04B 7/0456* (2017.01)
*H04B 7/06* (2006.01)
*H04B 7/08* (2006.01)

(52) U.S. Cl.
CPC ......... *H04B 7/0469* (2013.01); *H04B 7/0617* (2013.01); *H04B 7/086* (2013.01)

(58) Field of Classification Search
CPC .... H04B 7/0469; H04B 7/0617; H04B 7/086; H04B 7/0456
See application file for complete search history.

(56) References Cited

U.S. PATENT DOCUMENTS

2017/0170574 A1* 6/2017 Sacco .................. H01Q 21/205
2018/0234139 A1* 8/2018 Djordjevic ............... H01Q 3/34

FOREIGN PATENT DOCUMENTS

EP 3691149 A1 8/2020
EP 3691153 A1 8/2020

OTHER PUBLICATIONS

International Search Report and Written Opinion—PCT/CN2021/100510—ISA/EPO—Nov. 23, 2021.
(Continued)

*Primary Examiner* — Vineeta S Panwalkar
(74) *Attorney, Agent, or Firm* — Arent Fox, LLP and Qualcomm, Incorporated

(57) ABSTRACT

An example aspect comprises selecting an azimuth mode for an OAM MIMO transmission by a transmitter that includes a first number of circles that each include a second number of antenna elements, wherein the azimuth mode defines a DFT vector of a size less than or equal to the second number; selecting, from a plurality of radial modes associated with the azimuth mode, a radial mode for the transmission, wherein the radial modes include at least a first radial mode defining a first beamforming vector and a second radial mode defining a second beamforming vector, wherein each one of the first and second beamforming vectors includes the DFT vector weighted and repeated for a number of times less than or equal to the first number, wherein the first and second beamforming vectors are orthogonal to each other; and transmitting a signal using a beam configured according to the radial mode.

30 Claims, 12 Drawing Sheets

(56) References Cited

OTHER PUBLICATIONS

Sasaki H., et al., "Experiment on Over-100-Gbps Wireless Transmission with OAM-MIMO Multiplexing System in 28-GHz Band", 2018 IEEE Global Communications Conference (Globecom), IEEE, Dec. 9, 2018 (Dec. 9, 2018), pp. 1-6, XP033519524, DOI:10.1109/GLOCOM.2018.8647361, [retrieved on Feb. 20, 2019], p. 3-p. 4.

* cited by examiner

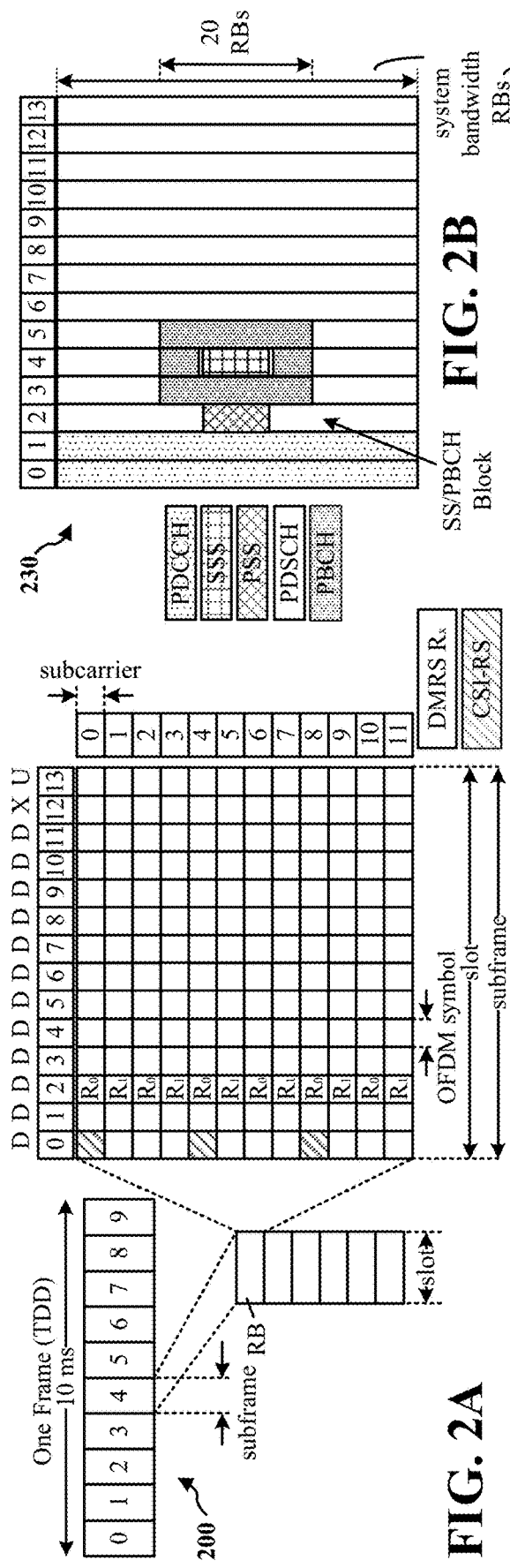
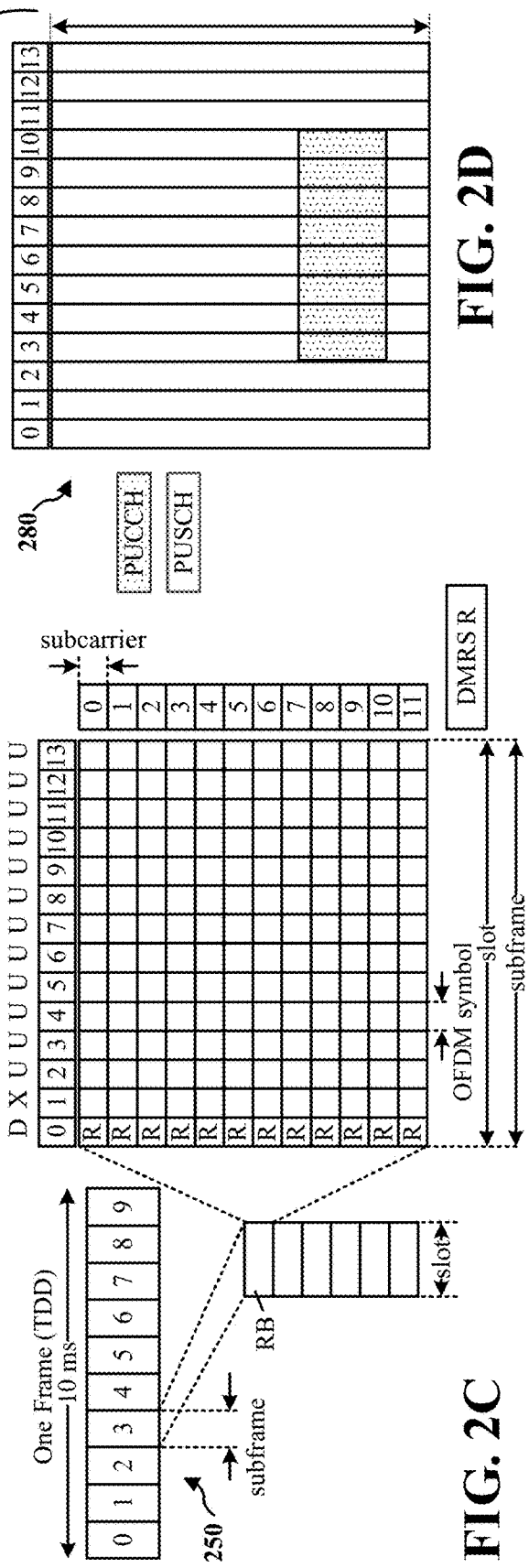
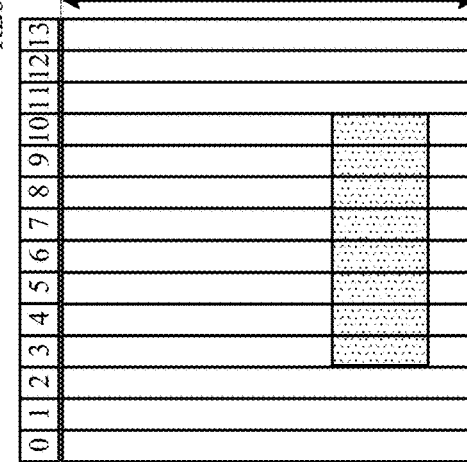

RADIAL MODES FOR OAM MIMO COMMUNICATION

CROSS-REFERENCE TO RELATED APPLICATION(S)

This application is a 35 U.S.C. § 371 National Phase Application of PCT Application No. PCT/CN2021/100510 filed Jun. 17, 2021, entitled "RADIAL MODES FOR OAM MIMO COMMUNICATION," which is assigned to the assignee hereof and hereby incorporated by reference herein in the entirety.

BACKGROUND

The present disclosure relates generally to communication systems, and more particularly, to multiple-input multiple-output (MIMO) communication.

Wireless communication systems are widely deployed to provide various telecommunication services such as telephony, video, data, messaging, and broadcasts. Typical wireless communication systems may employ multiple-access technologies capable of supporting communication with multiple users by sharing available system resources. Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

These multiple access technologies have been adopted in various telecommunication standards to provide a common protocol that enables different wireless devices to communicate on a municipal, national, regional, and even global level. An example telecommunication standard is 5G New Radio (NR). 5G NR is part of a continuous mobile broadband evolution promulgated by Third Generation Partnership Project (3GPP) to meet new requirements associated with latency, reliability, security, scalability (e.g., with Internet of Things (IoT)), and other requirements. 5G NR includes services associated with enhanced mobile broadband (eMBB), massive machine type communications (mMTC), and ultra reliable low latency communications (URLLC). Some aspects of 5G NR may be based on the 4G Long Term Evolution (LTE) standard. There exists a need for further improvements in 5G NR technology. These improvements may also be applicable to other multi-access technologies and the telecommunication standards that employ these technologies.

For example, improvements in beamforming in MIMO communication are desired.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

According to an example, a method of orbital angular momentum "OAM" multiple-input multiple-output "MIMO" communication at a transmitter includes selecting, from a plurality of azimuth modes, an azimuth mode for an OAM MIMO transmission from the transmitter to a receiver, wherein the transmitter includes a first number of antenna circles that each include a second number of antenna elements, wherein the azimuth mode defines a discrete Fourier transform "DFT" vector of a first size less than or equal to the second number. The method further includes selecting, from a plurality of radial modes associated with the azimuth mode, a radial mode for the OAM MIMO transmission, wherein the plurality of radial modes includes at least a first radial mode defining a first beamforming vector and a second radial mode defining a second beamforming vector, wherein each one of the first beamforming vector and the second beamforming vector includes the DFT vector weighted and repeated for a number of times less than or equal to the first number, wherein the first beamforming vector and the second beamforming vector are orthogonal to each other. The method further includes transmitting a signal by the transmitter to the receiver using an OAM MIMO beam that is configured according to the radial mode.

In other aspects, a transmitter apparatus for OAM MIMO communication includes a memory and a processor coupled with the memory. The processor is configured to select, from a plurality of azimuth modes, an azimuth mode for an OAM MIMO transmission from the transmitter apparatus to a receiver apparatus, wherein the transmitter apparatus includes a first number of antenna circles that each include a second number of antenna elements, wherein the azimuth mode defines a DFT vector of a first size less than or equal to the second number. The processor is further configured to select, from a plurality of radial modes associated with the azimuth mode, a radial mode for the OAM MIMO transmission, wherein the plurality of radial modes includes at least a first radial mode defining a first beamforming vector and a second radial mode defining a second beamforming vector, wherein each one of the first beamforming vector and the second beamforming vector includes the DFT vector weighted and repeated for a number of times less than or equal to the first number, wherein the first beamforming vector and the second beamforming vector are orthogonal to each other. The processor is further configured to transmit a signal by the transmitter apparatus to the receiver apparatus using an OAM MIMO beam that is configured according to the radial mode.

In other aspects, an apparatus includes means for selecting, from a plurality of azimuth modes, an azimuth mode for an OAM MIMO transmission from a transmitter to a receiver, wherein the transmitter includes a first number of antenna circles that each include a second number of antenna elements, wherein the azimuth mode defines a DFT vector of a first size less than or equal to the second number. The apparatus further includes means for selecting, from a plurality of radial modes associated with the azimuth mode, a radial mode for the OAM MIMO transmission, wherein the plurality of radial modes includes at least a first radial mode defining a first beamforming vector and a second radial mode defining a second beamforming vector, wherein each one of the first beamforming vector and the second beamforming vector includes the DFT vector weighted and repeated for a number of times less than or equal to the first number, wherein the first beamforming vector and the second beamforming vector are orthogonal to each other. The apparatus further includes means for transmitting a signal by the transmitter to the receiver using an OAM MIMO beam that is configured according to the radial mode.

In other aspects, a computer-readable medium stores code that, when executed by a processor, causes the processor to select, from a plurality of azimuth modes, an azimuth mode for an OAM MIMO transmission from a transmitter to a receiver, wherein the transmitter includes a first number of antenna circles that each include a second number of antenna elements, wherein the azimuth mode defines a DFT vector of a first size less than or equal to the second number. The code, when executed by the processor, further causes the processor to select, from a plurality of radial modes associated with the azimuth mode, a radial mode for the OAM MIMO transmission, wherein the plurality of radial modes includes at least a first radial mode defining a first beamforming vector and a second radial mode defining a second beamforming vector, wherein each one of the first beamforming vector and the second beamforming vector includes the DFT vector weighted and repeated for a number of times less than or equal to the first number, wherein the first beamforming vector and the second beamforming vector are orthogonal to each other. The code, when executed by the processor, further causes the processor to transmit a signal by the transmitter to the receiver using an OAM MIMO beam that is configured according to the radial mode.

According to a further example, a method of OAM MIMO communication at a receiver includes selecting, from a plurality of azimuth modes, an azimuth mode for receiving an OAM MIMO transmission from a transmitter to the receiver, wherein the receiver includes a first number of antenna circles that each include a second number of antenna elements, wherein the azimuth mode defines a DFT vector of a first size less than or equal to the second number. The method further includes selecting, from a plurality of radial modes associated with the azimuth mode, a radial mode for receiving the OAM MIMO transmission, wherein the plurality of radial modes includes at least a first radial mode defining a first beamforming vector and a second radial mode defining a second beamforming vector, wherein each one of the first beamforming vector and the second beamforming vector includes the DFT vector weighted and repeated for a number of times less than or equal to the first number, wherein the first beamforming vector and the second beamforming vector are orthogonal to each other. The method further includes receiving a signal by the receiver from the transmitter using an OAM MIMO beam that is configured according to the radial mode.

In other aspects, a receiver apparatus for OAM MIMO communication includes a memory and a processor coupled with the memory. The processor is configured to select, from a plurality of azimuth modes, an azimuth mode for receiving an OAM MIMO transmission from a transmitter apparatus to the receiver apparatus, wherein the receiver apparatus includes a first number of antenna circles that each include a second number of antenna elements, wherein the azimuth mode defines a DFT vector of a first size less than or equal to the second number. The processor is further configured to select, from a plurality of radial modes associated with the azimuth mode, a radial mode for receiving the OAM MIMO transmission, wherein the plurality of radial modes includes at least a first radial mode defining a first beamforming vector and a second radial mode defining a second beamforming vector, wherein each one of the first beamforming vector and the second beamforming vector includes the DFT vector weighted and repeated for a number of times less than or equal to the first number, wherein the first beamforming vector and the second beamforming vector are orthogonal to each other. The processor is further configured to receive a signal by the receiver apparatus from the transmitter apparatus using an OAM MIMO beam that is configured according to the radial mode.

In other aspects, an apparatus includes means for selecting, from a plurality of azimuth modes, an azimuth mode for receiving an OAM MIMO transmission from a transmitter to a receiver, wherein the receiver includes a first number of antenna circles that each include a second number of antenna elements, wherein the azimuth mode defines a discrete Fourier transform "DFT" vector of a first size less than or equal to the second number. The apparatus further includes means for selecting, from a plurality of radial modes associated with the azimuth mode, a radial mode for receiving the OAM MIMO transmission, wherein the plurality of radial modes includes at least a first radial mode defining a first beamforming vector and a second radial mode defining a second beamforming vector, wherein each one of the first beamforming vector and the second beamforming vector includes the DFT vector weighted and repeated for a number of times less than or equal to the first number, wherein the first beamforming vector and the second beamforming vector are orthogonal to each other. The apparatus further includes means for receiving a signal by the receiver from the transmitter using an OAM MIMO beam that is configured according to the radial mode.

In other aspects, a computer-readable medium stores code that, when executed by a processor, causes the processor to select, from a plurality of azimuth modes, an azimuth mode for receiving an OAM MIMO transmission from a transmitter to a receiver, wherein the receiver includes a first number of antenna circles that each include a second number of antenna elements, wherein the azimuth mode defines a DFT vector of a first size less than or equal to the second number. The code, when executed by the processor, further causes the processor to select, from a plurality of radial modes associated with the azimuth mode, a radial mode for receiving the OAM MIMO transmission, wherein the plurality of radial modes includes at least a first radial mode defining a first beamforming vector and a second radial mode defining a second beamforming vector, wherein each one of the first beamforming vector and the second beamforming vector includes the DFT vector weighted and repeated for a number of times less than or equal to the first number, wherein the first beamforming vector and the second beamforming vector are orthogonal to each other. The code, when executed by the processor, further causes the processor to receive a signal by the receiver from the transmitter using an OAM MIMO beam that is configured according to the radial mode.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

BRIEF DESCRIPTION OF THE DRAWINGS

FIG. 2A is a diagram illustrating an example of a first 5G/NR frame for use in communication by the base stations and/or the UEs in FIG. 1, according to some aspects of the present disclosure.

FIG. 2B is a diagram illustrating an example of DL channels within a 5G/NR subframe for use in communication by the base stations and/or the UEs in FIG. 1, according to some aspects of the present disclosure.

FIG. 2C is a diagram illustrating an example of a second 5G/NR frame for use in communication by the base stations and/or the UEs in FIG. 1, according to some aspects of the present disclosure.

FIG. 2D is a diagram illustrating an example of UL channels within a 5G/NR subframe for use in communication by the base stations and/or the UEs in FIG. 1, according to some aspects of the present disclosure.

DETAILED DESCRIPTION

Figure 1:
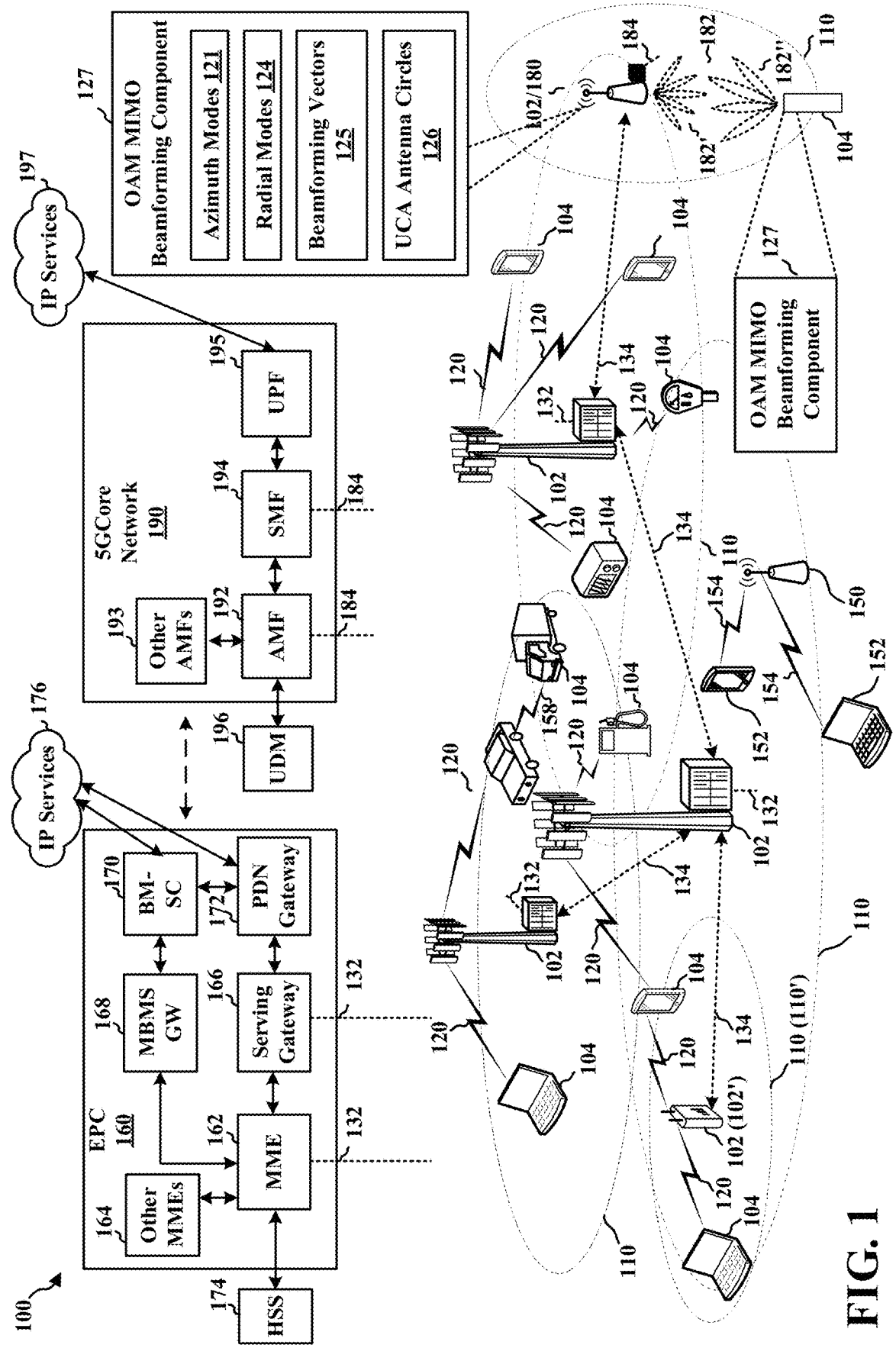
FIG. 1 is a schematic diagram of an example of a wireless communications system and an access network, including components for orbital angular momentum (OAM) multiple-input multiple-output (MIMO) communication, according to some aspects of the present disclosure.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

The present aspects generally relate to orbital angular momentum (OAM) multiple-input multiple-output (MIMO) communication. The present disclosure provides apparatus and methods of configuring an OAM MIMO beam by selecting azimuth modes and corresponding radial modes for one or more coaxial/concentric uniform circular array (UCA) antenna circles at a transmitter and/or a receiver. Accordingly, the present aspects provide multiple degree-of-freedom for MIMO transmissions. These and other features of the present disclosure are discussed in detail below with regard to FIGS. 1-12.

Several aspects of telecommunication systems will now be presented with reference to various apparatus and methods. These apparatus and methods will be described in the following detailed description and illustrated in the accompanying drawings by various blocks, components, circuits, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented as a "processing system" that includes one or more processors. Examples of processors include microprocessors, microcontrollers, graphics processing units (GPUs), central processing units (CPUs), application processors, digital signal processors (DSPs), reduced instruction set computing (RISC) processors, systems on a chip (SoC), baseband processors, field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software may be construed broadly to mean instructions, instruction sets, code, code segments, program code, programs, subprograms, software components, applications, software applications, software packages, routines, subroutines, objects, executables, threads of execution, procedures, functions, etc., whether referred to as software, firmware, middleware, microcode, hardware description language, or otherwise.

Accordingly, in one or more example aspects, the functions described may be implemented in hardware, software, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can include a random-access memory (RAM), a read-only memory (ROM), an electrically erasable programmable ROM (EEPROM), optical disk storage, magnetic disk storage, other magnetic storage devices, combinations of the aforementioned types of computer-readable media, or any other medium that can be used to store computer executable code in the form of instructions or data structures that can be accessed by a computer.

FIG. 1 is a diagram illustrating an example of a wireless communications system and an access network 100 including one or more UEs 104 and/or base stations 102 (e.g., gNBs) configured for OAM MIMO beamforming. More specifically, for example, a base station 102 may include one or more coaxial/concentric UCA antenna circles 126 and an OAM MIMO beamforming component 127 that is operable to select one of multiple azimuth modes 121 and a corresponding one of multiple radial modes 124 for OAM MIMO beamforming, where the azimuth mode and the radial mode define one of multiple beamforming vectors 125 for configuring an OAM MIMO beam (e.g., 182) for wireless communication (e.g., receiving or transmitting a signal) via the coaxial/concentric UCA antenna circles 126 of the base station 102. One or more UEs 104 may also include the OAM MIMO beamforming component 127 that provides similar functionality. Further details of the operations performed by the OAM MIMO beamforming component 127 in a UE 104 and/or in a base station 102 are discussed in more detail below.

The wireless communications system (also referred to as a wireless wide area network (WWAN)) includes base stations 102, UEs 104, an Evolved Packet Core (EPC) 160, and another core network 190 (e.g., a 5G Core (5GC)).

The base stations 102 may include macrocells (high power cellular base station) and/or small cells (low power cellular base station). The macrocells include base stations. The small cells include femtocells, picocells, and microcells.

The base stations 102 configured for 4G LTE (collectively referred to as Evolved Universal Mobile Telecommunications System (UMTS) Terrestrial Radio Access Network (E-UTRAN)) may interface with the EPC 160 through first backhaul links 132 (e.g., SI interface). The base stations 102 configured for 5G NR (collectively referred to as Next Generation RAN (NG-RAN)) may interface with core network 190 through second backhaul links 184. In addition to other functions, the base stations 102 may perform one or more of the following functions: transfer of user data, radio channel ciphering and deciphering, integrity protection, header compression, mobility control functions (e.g., handover, dual connectivity), inter-cell interference coordination, connection setup and release, load balancing, distribution for non-access stratum (NAS) messages, NAS node selection, synchronization, radio access network (RAN) sharing, multimedia broadcast multicast service (MBMS), subscriber and equipment trace, RAN information management (RIM), paging, positioning, and delivery of warning messages. The base stations 102 may communicate directly or indirectly (e.g., through the EPC 160 or core network 190) with each other over third backhaul links 134 (e.g., X2 interface). The backhaul links 132, 134, and 184 may be wired or wireless.

The base stations 102 may wirelessly communicate with the UEs 104. Each of the base stations 102 may provide communication coverage for a respective geographic coverage area 110. There may be overlapping geographic coverage areas 110. For example, the small cell 102' may have a coverage area 110' that overlaps the coverage area 110 of one or more macro base stations 102. A network that includes both small cell and macrocells may be known as a heterogeneous network. A heterogeneous network may also include Home Evolved Node Bs (eNBs) (HeNBs), which may provide service to a restricted group known as a closed subscriber group (CSG). The communication links 120 between the base stations 102 and the UEs 104 may include uplink (UL) (also referred to as reverse link) transmissions from a UE 104 to a base station 102 and/or downlink (DL) (also referred to as forward link) transmissions from a base station 102 to a UE 104. The communication links 120 may use multiple-input and multiple-output (MIMO) antenna technology, including spatial multiplexing, beamforming, and/or transmit diversity. The communication links may be through one or more carriers. The base stations 102/UEs 104 may use spectrum up to Y MHz (e.g., 5, 10, 15, 20, 100, 400, etc. MHz) bandwidth per carrier allocated in a carrier aggregation of up to a total of Yx MHz (x component carriers) used for transmission in each direction. The carriers may or may not be adjacent to each other. Allocation of carriers may be asymmetric with respect to DL and UL (e.g., more or fewer carriers may be allocated for DL than for UL). The component carriers may include a primary component carrier and one or more secondary component carriers. A primary component carrier may be referred to as a primary cell (PCell) and a secondary component carrier may be referred to as a secondary cell (SCell).

Certain UEs 104 may communicate with each other using device-to-device (D2D) communication link 158, e.g., including synchronization signals. The D2D communication link 158 may use the DL/UL WWAN spectrum. The D2D communication link 158 may use one or more sidelink channels, such as a physical sidelink broadcast channel (PSBCH), a physical sidelink discovery channel (PSDCH), a physical sidelink shared channel (PSSCH), and a physical sidelink control channel (PSCCH). D2D communication may be through a variety of wireless D2D communications systems, such as for example, FlashLinQ, WiMedia, Bluetooth, ZigBee, Wi-Fi based on the IEEE 802.11 standard, LTE, or NR.

The wireless communications system may further include a Wi-Fi access point (AP) 150 in communication with Wi-Fi stations (STAs) 152 via communication links 154, e.g., in a 5 GHz unlicensed frequency spectrum or the like. When communicating in an unlicensed frequency spectrum, the STAs 152/AP 150 may perform a clear channel assessment (CCA) prior to communicating in order to determine whether the channel is available.

The small cell 102' may operate in a licensed and/or an unlicensed frequency spectrum. When operating in an unlicensed frequency spectrum, the small cell 102' may employ NR and use the same (e.g., 5 GHZ, or the like) unlicensed frequency spectrum as may be used by the Wi-Fi AP 150. The small cell 102', employing NR in an unlicensed frequency spectrum, may boost coverage to and/or increase capacity of the access network.

The electromagnetic spectrum is often subdivided, based on frequency/wavelength, into various classes, bands, channels, etc. In 5G NR two initial operating bands have been identified as frequency range designations FR1 (410 MHz-7.125 GHz) and FR2 (24.25 GHz-52.6 GHz). The frequencies between FR1 and FR2 are often referred to as mid-band frequencies. Although a portion of FR1 is greater than 6 GHZ, FR1 is often referred to (interchangeably) as a "sub-6 GHz" band in various documents and articles. A similar nomenclature issue sometimes occurs with regard to FR2, which is often referred to (interchangeably) as a "millimeter wave" band in documents and articles, despite being different from the extremely high frequency (EHF) band (30 GHz-300 GHz) which is identified by the International Telecommunications Union (ITU) as a "millimeter wave" band.

With the above aspects in mind, unless specifically stated otherwise, it should be understood that the term "sub-6 GHz" or the like if used herein may broadly represent frequencies that may be less than 6 GHz, may be within FR1, or may include mid-band frequencies. Further, unless specifically stated otherwise, it should be understood that the term "millimeter wave" or the like if used herein may broadly represent frequencies that may include mid-band frequencies, may be within FR2, or may be within the EHF band.

A base station 102, whether a small cell 102' or a large cell (e.g., macro base station), may include an eNB, gNodeB (gNB), or another type of base station. Some base stations, such as gNB 180 may operate in a traditional sub 6 GHz spectrum, in millimeter wave frequencies, and/or near millimeter wave frequencies in communication with the UE 104. When the gNB 180 operates in millimeter wave or near millimeter wave frequencies, the gNB 180 may be referred to as a millimeter wave base station. The millimeter wave base station 180 may utilize beamforming 182 with the UE 104 to compensate for path loss and short range. The base station 180 and the UE 104 may each include a plurality of antennas, such as antenna elements, antenna panels, and/or antenna arrays to facilitate the beamforming.

The base station 180 may transmit a beamformed signal to the UE 104 in one or more transmit directions 182'. The UE 104 may receive the beamformed signal from the base station 180 in one or more receive directions 182". The UE 104 may also transmit a beamformed signal to the base station 180 in one or more transmit directions. The base station 180 may receive the beamformed signal from the UE 104 in one or more receive directions. The base station 180/UE 104 may perform beam training to determine the best receive and transmit directions for each of the base station 180/UE 104. The transmit and receive directions for the base station 180 may or may not be the same. The transmit and receive directions for the UE 104 may or may not be the same.

The EPC 160 may include a Mobility Management Entity (MME) 162, other MMEs 164, a Serving Gateway 166, a Multimedia Broadcast Multicast Service (MBMS) Gateway 168, a Broadcast Multicast Service Center (BM-SC) 170, and a Packet Data Network (PDN) Gateway 172. The MME 162 may be in communication with a Home Subscriber Server (HSS) 174. The MME 162 is the control node that processes the signaling between the UEs 104 and the EPC 160. Generally, the MME 162 provides bearer and connection management. All user Internet protocol (IP) packets are transferred through the Serving Gateway 166, which itself is connected to the PDN Gateway 172. The PDN Gateway 172 provides UE IP address allocation as well as other functions. The PDN Gateway 172 and the BM-SC 170 are connected to the IP Services 176. The IP Services 176 may include the Internet, an intranet, an IP Multimedia Subsystem (IMS), a PS Streaming Service, and/or other IP services. The BM-SC 170 may provide functions for MBMS user service provisioning and delivery. The BM-SC 170 may serve as an entry point for content provider MBMS transmission, may be used to authorize and initiate MBMS Bearer Services within a public land mobile network (PLMN), and may be used to schedule MBMS transmissions. The MBMS Gateway 168 may be used to distribute MBMS traffic to the base stations 102 belonging to a Multicast Broadcast Single Frequency Network (MBSFN) area broadcasting a particular service, and may be responsible for session management (start/stop) and for collecting eMBMS related charging information.

The core network 190 may include an Access and Mobility Management Function (AMF) 192, other AMFs 193, a Session Management Function (SMF) 194, and a User Plane Function (UPF) 195. The AMF 192 may be in communication with a Unified Data Management (UDM) 196. The AMF 192 is the control node that processes the signaling between the UEs 104 and the core network 190. Generally, the AMF 192 provides QoS flow and session management. All user Internet protocol (IP) packets are transferred through the UPF 195. The UPF 195 provides UE IP address allocation as well as other functions. The UPF 195 is connected to the IP Services 197. The IP Services 197 may include the Internet, an intranet, an IP Multimedia Subsystem (IMS), a PS Streaming Service, and/or other IP services.

The base station 102 may also include and/or be referred to as a gNB, Node B, evolved Node B (eNB), an access point, a base transceiver station, a radio base station, a radio transceiver, a transceiver function, a basic service set (BSS), an extended service set (ESS), a transmit reception point (TRP), or some other suitable terminology. The base station 102 provides an access point to the EPC 160 or core network 190 for a UE 104. Examples of UEs 104 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, a tablet, a smart device, a wearable device, a vehicle, an electric meter, a gas pump, a large or small kitchen appliance, a healthcare device, an implant, a sensor/actuator, a display, or any other similar functioning device. Some of the UEs 104 may be referred to as IoT devices (e.g., parking meter, gas pump, toaster, vehicles, heart monitor, etc.). The UE 104 may also be referred to as a station, a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology.

Referring to FIGS. 2A-2D, one or more example frame structures, channels, and resources may be used for communication between the base stations 102 and the UEs 104 of FIG. 1. FIG. 2A is a diagram 200 illustrating an example of a first subframe within a 5G/NR frame structure. FIG. 2B is a diagram 230 illustrating an example of DL channels within a 5G/NR subframe. FIG. 2C is a diagram 250 illustrating an example of a second subframe within a 5G/NR frame structure. FIG. 2D is a diagram 280 illustrating an example of UL channels within a 5G/NR subframe. The 5G/NR frame structure may be FDD in which for a particular set of subcarriers (carrier system bandwidth), subframes within the set of subcarriers are dedicated for either DL or UL, or may be TDD in which for a particular set of subcarriers (carrier system bandwidth), subframes within the set of subcarriers are dedicated for both DL and UL. In the examples provided by FIGS. 2A, 2C, the 5G/NR frame structure is assumed to be TDD, with subframe 4 being configured with slot format 28 (with mostly DL), where D is DL, U is UL, and X is flexible for use between DL/UL, and subframe 3 being configured with slot format 34 (with mostly UL). While subframes 3, 4 are shown with slot formats 34, 28, respectively, any particular subframe may be configured with any of the various available slot formats 0-61. Slot formats 0, 1 are all DL, UL, respectively. Other slot formats 2-61 include a mix of DL, UL, and flexible symbols. UEs are configured with the slot format (dynamically through DL control information (DCI), or semi-statically/statically through radio resource control (RRC) signaling) through a received slot format indicator (SFI). Note that the description infra applies also to a 5G/NR frame structure that is TDD.

Other wireless communication technologies may have a different frame structure and/or different channels. A frame (10 ms) may be divided into 10 equally sized subframes (1 ms). Each subframe may include one or more time slots. Subframes may also include mini-slots, which may include 7, 4, or 2 symbols. Each slot may include 7 or 14 symbols, depending on the slot configuration. For slot configuration 0, each slot may include 14 symbols, and for slot configuration 1, each slot may include 7 symbols. The symbols on DL may be cyclic prefix (CP) OFDM (CP-OFDM) symbols. The symbols on UL may be CP-OFDM symbols (for high throughput scenarios) or discrete Fourier transform (DFT) spread OFDM (DFT-s-OFDM) symbols (also referred to as single carrier frequency-division multiple access (SC-FDMA) symbols) (for power limited scenarios; limited to a single stream transmission). The number of slots within a subframe is based on the slot configuration and the numerology. For slot configuration 0, different numerologies µ0 to 5 allow for 1, 2, 4, 8, 16, and 32 slots, respectively, per subframe. For slot configuration 1, different numerologies 0 to 2 allow for 2, 4, and 8 slots, respectively, per subframe. Accordingly, for slot configuration 0 and numerology u, there are 14 symbols/slot and 24 slots/subframe. The subcarrier spacing and symbol length/duration are a function of the numerology. The subcarrier spacing may be equal to $2^{\mu}*15$ kHz, where u is the numerology 0 to 5. As such, the numerology $\mu=0$ has a subcarrier spacing of 15 kHz and the numerology $\mu=5$ has a subcarrier spacing of 480 kHz. The symbol length/duration is inversely related to the subcarrier spacing. FIGS. 2A-2D provide an example of slot configuration 0 with 14 symbols per slot and numerology $\mu=0$ with 1 slot per subframe. The subcarrier spacing is 15 kHz and symbol duration is approximately 66.7 µs.

A resource grid may be used to represent the frame structure. Each time slot includes a resource block (RB) (also referred to as physical RBs (PRBs)) that extends 12 consecutive subcarriers. The resource grid is divided into multiple resource elements (REs). The number of bits carried by each RE depends on the modulation scheme.

As illustrated in FIG. 2A, some of the REs carry reference (pilot) signals (RS) for the UE. The RS may include demodulation RS (DM-RS) (indicated as Rx for one particular configuration, where 100× is the port number, but other DM-RS configurations are possible) and channel state information reference signals (CSI-RS) for channel estimation at the UE. The RS may also include beam measurement RS (BRS), beam refinement RS (BRRS), and phase tracking RS (PT-RS).

FIG. 2B illustrates an example of various DL channels within a subframe of a frame. The physical downlink control channel (PDCCH) carries DCI within one or more control channel elements (CCEs), each CCE including nine RE groups (REGs), each REG including four consecutive REs in an OFDM symbol. A primary synchronization signal (PSS) may be within symbol 2 of particular subframes of a frame. The PSS is used by a UE 104 to determine subframe/symbol timing and a physical layer identity. A secondary synchronization signal (SSS) may be within symbol 4 of particular subframes of a frame. The SSS is used by a UE to determine a physical layer cell identity group number and radio frame timing. Based on the physical layer identity and the physical layer cell identity group number, the UE can determine a physical cell identifier (PCI). Based on the PCI, the UE can determine the locations of the aforementioned DM-RS. The physical broadcast channel (PBCH), which carries a master information block (MIB), may be logically grouped with the PSS and SSS to form a synchronization signal (SS)/PBCH block. The MIB provides a number of RBs in the system bandwidth and a system frame number (SFN). The physical downlink shared channel (PDSCH) carries user data, broadcast system information not transmitted through the PBCH such as system information blocks (SIBs), and paging messages.

As illustrated in FIG. 2C, some of the REs carry DM-RS (indicated as R for one particular configuration, but other DM-RS configurations are possible) for channel estimation at the base station. The UE may transmit DM-RS for the physical uplink control channel (PUCCH) and DM-RS for the physical uplink shared channel (PUSCH). The PUSCH DM-RS may be transmitted in the first one or two symbols of the PUSCH. The PUCCH DM-RS may be transmitted in different configurations depending on whether short or long PUCCHs are transmitted and depending on the particular PUCCH format used. The UE may transmit sounding reference signals (SRS). The SRS may be transmitted in the last symbol of a subframe. The SRS may have a comb structure, and a UE may transmit SRS on one of the combs. The SRS may be used by a base station for channel quality estimation to enable frequency-dependent scheduling on the UL.

FIG. 2D illustrates an example of various UL channels within a subframe of a frame. The PUCCH may be located as indicated in one configuration. The PUCCH carries uplink control information (UCI), such as scheduling requests, a channel quality indicator (CQI), a precoding matrix indicator (PMI), a rank indicator (RI), and HARQ ACK/NACK feedback. The PUSCH carries data, and may additionally be used to carry a buffer status report (BSR), a power headroom report (PHR), and/or UCI.

Figure 3:
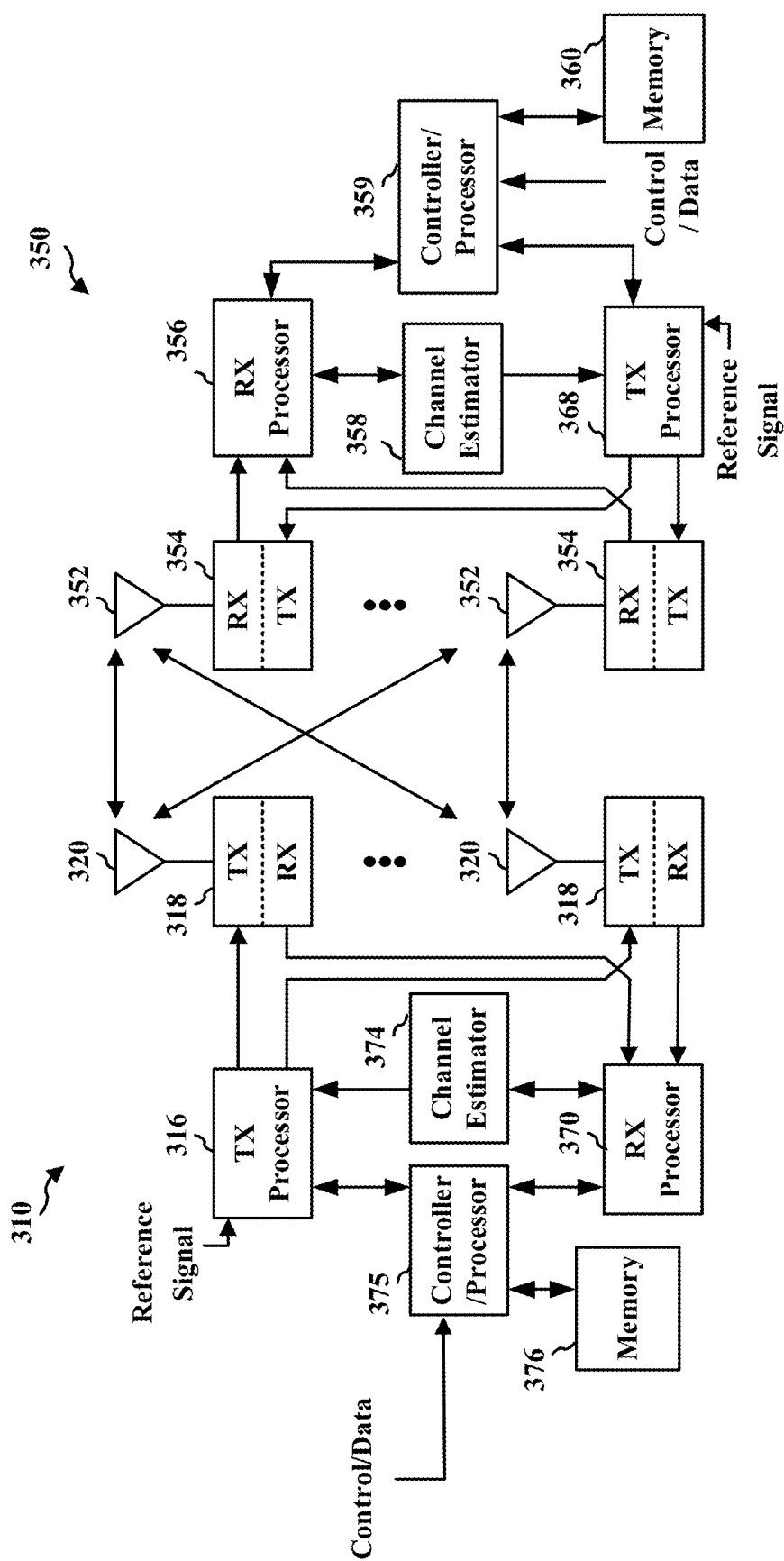
FIG. 3 is a schematic diagram of an example of hardware components of two of the communicating nodes in the system of FIG. 1, according to some aspects of the present disclosure.

FIG. 3 is a diagram of hardware components of example transmitting and/or receiving (tx/rx) nodes 310 and 350. In one specific example, the tx/rx node 310 may be an example implementation of base station 102 and the tx/rx node 350 may be an example implementation of UE 104.

For example, in the DL, IP packets from the EPC 160 or 5G core 190 may be provided to a controller/processor 375 of the tx/rx node 310 (e.g., base station 102). The controller/processor 375 implements layer 3 and layer 2 functionality. Layer 3 includes a radio resource control (RRC) layer, and layer 2 includes a service data adaptation protocol (SDAP) layer, a packet data convergence protocol (PDCP) layer, a radio link control (RLC) layer, and a medium access control (MAC) layer. The controller/processor 375 provides RRC layer functionality associated with broadcasting of system information (e.g., MIB, SIBs), RRC connection control (e.g., RRC connection paging, RRC connection establishment, RRC connection modification, and RRC connection release), inter radio access technology (RAT) mobility, and measurement configuration for UE measurement reporting; PDCP layer functionality associated with header compression/decompression, security (ciphering, deciphering, integrity protection, integrity verification), and handover support functions; RLC layer functionality associated with the transfer of upper layer packet data units (PDUs), error correction through ARQ, concatenation, segmentation, and reassembly of RLC service data units (SDUs), re-segmentation of RLC data PDUs, and reordering of RLC data PDUs; and MAC layer functionality associated with mapping between logical channels and transport channels, multiplexing of MAC SDUs onto transport blocks (TBs), demultiplexing of MAC SDUs from TBs, scheduling information reporting, error correction through HARQ, priority handling, and logical channel prioritization.

The transmit (TX) processor 316 and the receive (RX) processor 370 implement layer 1 functionality associated with various signal processing functions. Layer 1, which includes a physical (PHY) layer, may include error detection on the transport channels, forward error correction (FEC) coding/decoding of the transport channels, interleaving, rate matching, mapping onto physical channels, modulation/demodulation of physical channels, and MIMO antenna processing. The TX processor 316 handles mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols may then be split into parallel streams. Each stream may then be mapped to an OFDM subcarrier, multiplexed with a reference signal (e.g., pilot) in the time and/or frequency domain, and then combined together using an Inverse Fast Fourier Transform (IFFT) to produce a physical channel carrying a time domain OFDM symbol stream. The OFDM stream is spatially precoded to produce multiple spatial streams. Channel estimates from a channel estimator 374 may be used to determine the coding and modulation scheme, as well as for spatial processing. The channel estimate may be derived from a reference signal and/or channel condition feedback transmitted by the tx/rx node 350. Each spatial stream may then be provided to a different antenna 320 via a separate transmitter 318TX. Each transmitter 318TX may modulate an RF carrier with a respective spatial stream for transmission.

At the tx/rx node 350 (e.g., UE 104), each receiver 354RX receives a signal through its respective antenna 352. Each receiver 354RX recovers information modulated onto an RF carrier and provides the information to the receive (RX) processor 356. The TX processor 368 and the RX processor 356 implement layer 1 functionality associated with various signal processing functions. The RX processor 356 may perform spatial processing on the information to recover any spatial streams destined for the tx/rx node 350. If multiple spatial streams are destined for the tx/rx node 350, they may be combined by the RX processor 356 into a single OFDM symbol stream. The RX processor 356 then converts the OFDM symbol stream from the time-domain to the frequency domain using a Fast Fourier Transform (FFT). The frequency domain signal includes a separate OFDM symbol stream for each subcarrier of the OFDM signal. The symbols on each subcarrier, and the reference signal, are recovered and demodulated by determining the most likely signal constellation points transmitted by the tx/rx node 310. These soft decisions may be based on channel estimates computed by the channel estimator 358. The soft decisions are then decoded and deinterleaved to recover the data and control signals that were originally transmitted by the tx/rx node 310 on the physical channel. The data and control signals are then provided to the controller/processor 359, which implements layer 3 and layer 2 functionality.

The controller/processor 359 can be associated with a memory 360 that stores program codes and data. The memory 360 may be referred to as a computer-readable medium. In the UL, the controller/processor 359 provides demultiplexing between transport and logical channels, packet reassembly, deciphering, header decompression, and control signal processing to recover IP packets from the EPC 160. The controller/processor 359 is also responsible for error detection using an ACK and/or NACK protocol to support HARQ operations.

Similar to the functionality described in connection with the DL transmission by the tx/rx node 310, the controller/processor 359 provides RRC layer functionality associated with system information (e.g., MIB, SIBs) acquisition, RRC connections, and measurement reporting; PDCP layer functionality associated with header compression/decompression, and security (ciphering, deciphering, integrity protection, integrity verification); RLC layer functionality associated with the transfer of upper layer PDUs, error correction through ARQ, concatenation, segmentation, and reassembly of RLC SDUs, re-segmentation of RLC data PDUs, and reordering of RLC data PDUs; and MAC layer functionality associated with mapping between logical channels and transport channels, multiplexing of MAC SDUs onto TBs, demultiplexing of MAC SDUs from TBs, scheduling information reporting, error correction through HARQ, priority handling, and logical channel prioritization.

Channel estimates derived by a channel estimator 358 from a reference signal or feedback transmitted by the tx/rx node 310 may be used by the TX processor 368 to select the appropriate coding and modulation schemes, and to facilitate spatial processing. The spatial streams generated by the TX processor 368 may be provided to different antenna 352 via separate transmitters 354TX. Each transmitter 354TX may modulate an RF carrier with a respective spatial stream for transmission.

The UL transmission is processed at the tx/rx node 310 in a manner similar to that described in connection with the receiver function at the tx/rx node 350. Each receiver 318RX receives a signal through its respective antenna 320. Each receiver 318RX recovers information modulated onto an RF carrier and provides the information to a RX processor 370.

The controller/processor 375 can be associated with a memory 376 that stores program codes and data. The memory 376 may be referred to as a computer-readable medium. In the UL, the controller/processor 375 provides demultiplexing between transport and logical channels, packet reassembly, deciphering, header decompression, control signal processing to recover IP packets from the tx/rx node 350. IP packets from the controller/processor 375 may be provided to the EPC 160. The controller/processor 375 is also responsible for error detection using an ACK and/or NACK protocol to support HARQ operations.

In an implementation, at least one of the TX processor 368, the RX processor 356, and the controller/processor 359 may be configured to perform aspects in connection with OAM MIMO beamforming component 127 of FIG. 1.

In an implementation, at least one of the TX processor 316, the RX processor 370, and the controller/processor 375 may be configured to perform aspects in connection with OAM MIMO beamforming component 127 of FIG. 1.

In OAM communication, a transmitter radiates multiple coaxially propagating, spatially-overlapping waves (referred to as OAM modes l= . . . , −2, −1,0,1,2, . . . ) each carrying a data stream through multiple apertures or through multiple coaxial uniform circular array (UCA) antenna circles. An electromagnetic wave with a helical transverse phase of the form exp (iφl) carries an OAM mode waveform, where φ is the azimuthal angle and l is an unbounded integer which may be referred to as OAM order. Conventional electromagnetic beams such as Gaussian beams are OAM beams with l=0. Theoretically, these waves/modes can be orthogonally received at the same radio resource (e.g., in time-frequency domains), therefore using OAM multiplexing can greatly improve communication spectrum efficiency with low receiver processing complexity. Polarization may be added to each OAM mode to double the number of orthogonal streams.

Figure 4:
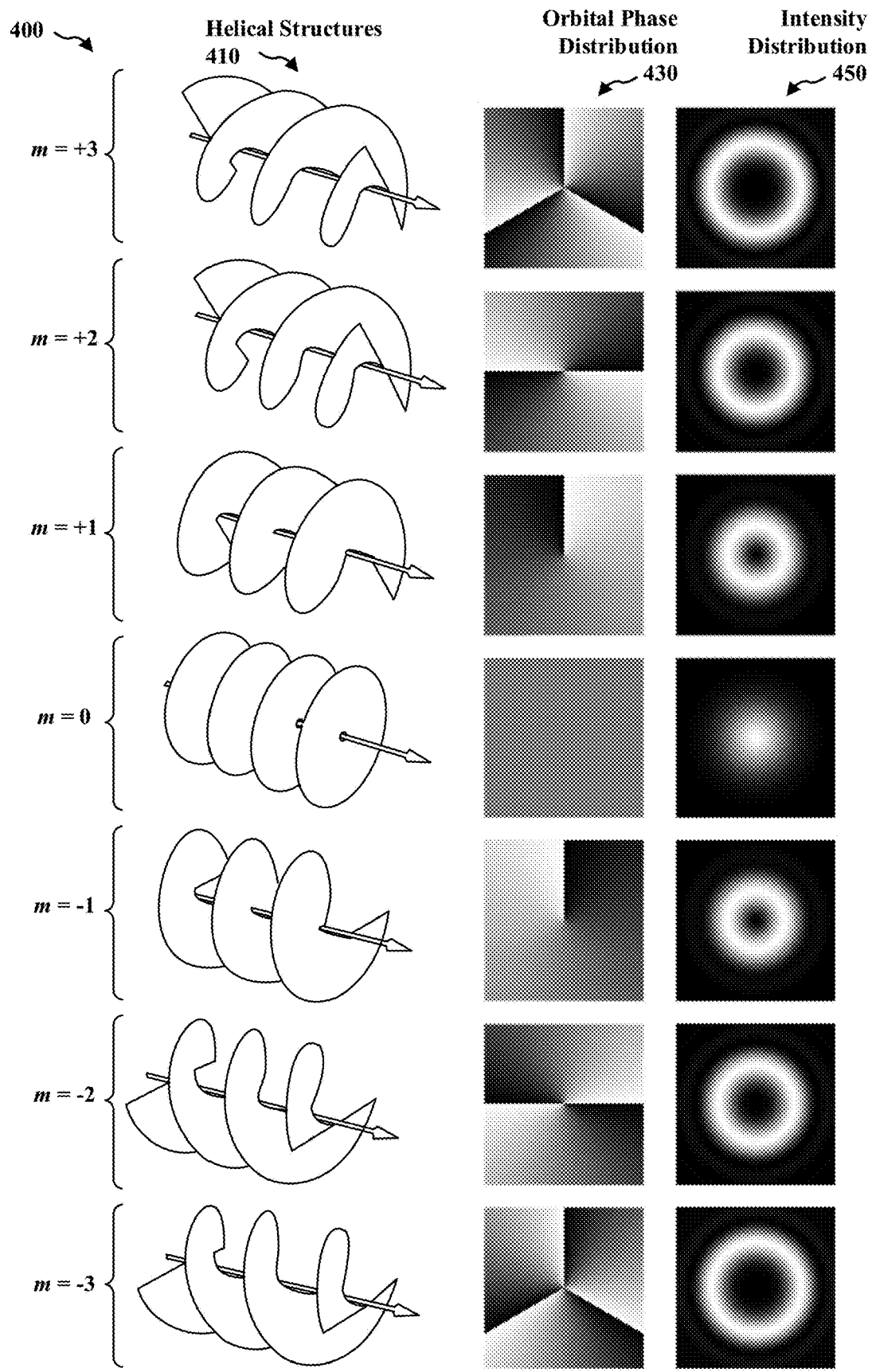
FIG. 4 is a schematic diagram of example OAM waveforms/modes and their phase and intensity distributions, according to some aspects of the present disclosure.

FIG. 4 includes one non-limiting example of OAM waveforms 400 of OAM modes −3, −2, −1, 0, +1, +2, and +3, and their respective orbital phase distributions 430 and intensity distributions 450. As illustrated in FIG. 4, the OAM waveforms 400 have helical structures 410.

Figure 5:
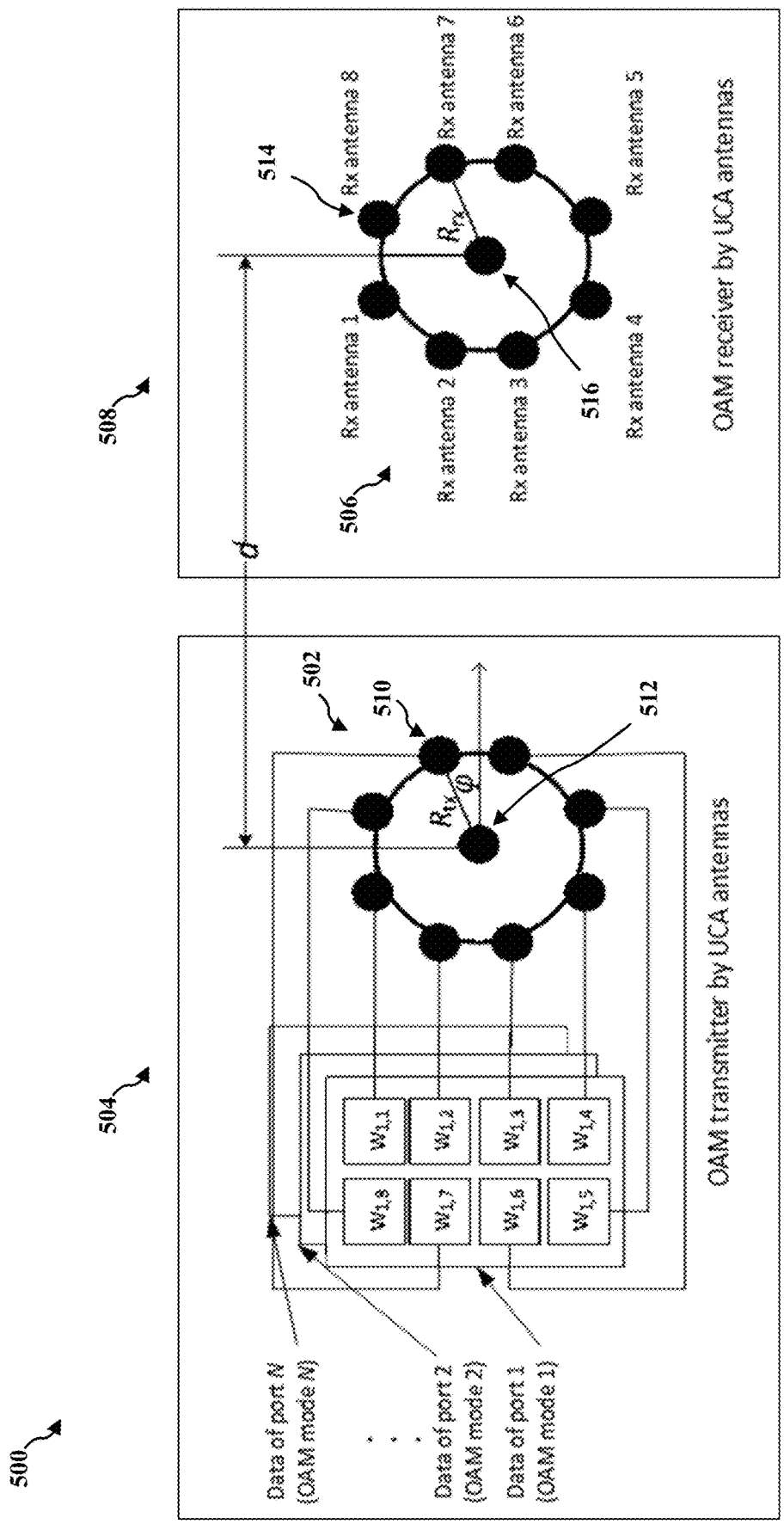
FIG. 5 is a schematic diagram of an example OAM communication system including an OAM transmitter and an OAM receiver, according to some aspects of the present disclosure.
Figure 6:
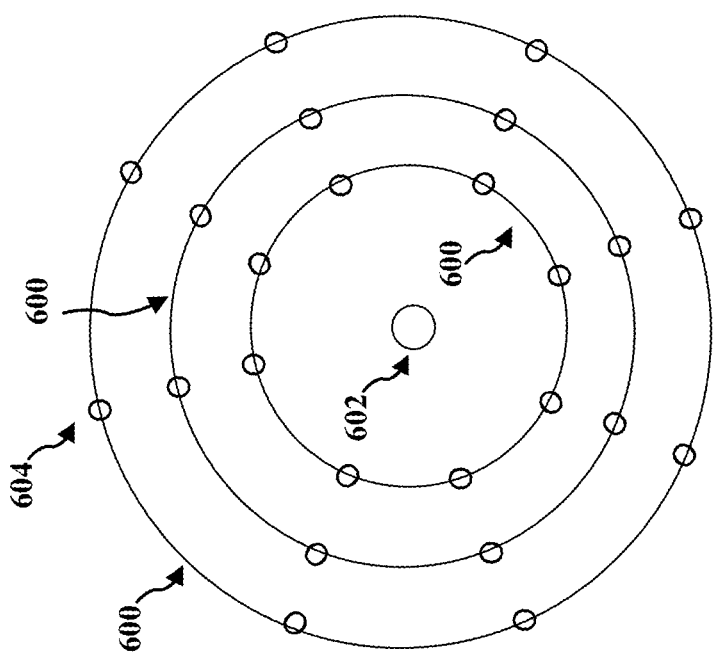
FIG. 6 is a schematic diagram of an example of multiple concentric uniform circular array (UCA) antenna circles that may be included in an OAM transmitter or in an OAM receiver, according to some aspects of the present disclosure.

Referring to FIG. 5, in one non-limiting aspect, for example, an OAM-based communication system 500 may be realized by a first set of UCA antenna circles 502 at an OAM transmitter 504 and a second set of UCA antenna circles 506 at an OAM receiver 508 (although only one circle of non-zero radius is visually represented in each one of the OAM transmitter 504 and the OAM receiver 508, the present aspects are not so limited, and each one of the OAM transmitter 504 and the OAM receiver 508 may include more than one circle of non-zero radius, e.g., refer to the example aspect in FIG. 6 below). The transmit antenna elements 510 are evenly spaced (equidistantly radially spaced apart) in each circle at the OAM transmitter 504. By multiplying respective OAM-formed weights $w_1=[w_{1,1}, w_{1,2}, \ldots, w_{1,8}]^T$ onto each antenna element in a circle, a signal port is generated. If the weight of each antenna element in a circle is equal to $\exp(i\varphi l)$, where $\varphi$ is the angle of the antenna in the circle and l is the OAM mode index, then this OAM-formed port is equivalent to OAM mode l. By using different OAM-formed weights $\exp(i\varphi l')$, where $l' \neq l$, multiple OAM modes are generated. The center antenna 512 of all circles in the OAM transmitter 504 may be used alone to generate OAM mode 0. The receive antenna elements 514 at the OAM receiver 508 are also evenly spaced (equidistantly radially spaced apart) in each circle, and the center antenna 516 of all circles in the OAM receiver 508 may be used alone for OAM mode 0.

Denoting the channel matrix from all transmit antennas at the OAM transmitter 504 to all receive antennas at the OAM receiver 508 as H, in the OAM-formed channel matrix $\tilde{H}=H \cdot [w_1, w_2, \ldots, w_L]$, any two columns of $\tilde{H}$ are orthogonal. That means the OAM channels have no crosstalk, hence OAM-based communication can efficiently realize a high-level spatial multiplexing degree.

Referring to FIG. 6, in some non-limiting aspects, an OAM transmitter may include multiple coaxial UCA antenna circles 600 and a central antenna 602 at the shared center of the coaxial UCA antenna circles 600. Each one of the coaxial UCA antenna circles 600 includes a number of evenly spaced antenna elements 604. In an aspect, the intra-circle streams are orthogonal, and the inter-circle streams with different OAM modes are also orthogonal. The inter-circle streams with the same OAM mode are non-orthogonal. For each OAM mode, there exists inter-circle interference. That is, the stream transmitted from one circle is mutually interfered with the stream transmitted from another circle when these two streams have the same OAM mode. Similarly, an OAM receiver may also include multiple coaxial UCA circles and a central antenna at the shared center of the coaxial UCA antenna circles as described above.

In some aspects, OAM communication performs well in short/middle-distance wireless communication (e.g., backhaul/access), especially at high frequency spectrum (e.g., sub-THz, THz, etc.). In some aspects, an OAM transmitter may be a UE 104, a base station 102, etc., and an OAM receiver may also be a UE 104, a base station 102, etc. For example, for wireless backhaul transmission, OAM is applicable for communication between a base station and a relay node. As another example, for fixed wireless access, OAM is applicable for communication between a base station and a fixed UE, e.g., a customer premise equipment (CPE). As another example, for inter-device transmission, OAM is applicable for communication between two fixed UEs, e.g., inter-server connection in a data center.

In some aspects, OAM offers multiple degrees of freedom for MIMO transmissions in a light-of-sight channel under proper conditions concerning wavelength, distance, and size of transceiver arrays. The multiple modes for OAM MIMO may be obtained in both azimuth and radial directions. Some present aspects provide OAM radial modes for an OAM waveform by identifying structures in the solution to Maxwell equations and in the singular value decomposition (SVD) of finite matrices, which lead to low complexity calculation and reduced feedback overhead.

The Maxwell equations as vector equations in free space without any free charge may be solved by a scalar form, namely, the Helmholtz equation:

$$\nabla^2 v + k^2 v = 0$$

where $\nabla^2$ is the Laplace operator, $k^2$ is an eigenvalue, and v is an eigenfunction. Assuming the below paraxial wave:

$$v = u e^{ikz}$$

and assuming that the variation of the amplitude u in the z direction is slow and dropping the below term:

$$\frac{\partial^2}{\partial z^2} u$$

the Helmholtz equation becomes:

$$i\frac{\partial^2}{\partial z^2} u = 1 \frac{1}{2k}\left(\frac{\partial^2}{\partial x^2} + \frac{\partial^2}{\partial y^2}\right) u$$

The above partial differential equation (PDE) may be solved by finding a differential solution or by finding an integral solution. The integral solution may be based on the Green function and the Huygens-Fresnel principle.

The Laguerre-Gaussian modes/waveforms in cylindrical polar coordinates $(\rho, \varphi, z)$ may be described as:

$$u_{\ell p} = \sqrt{\frac{2p!}{\pi(p+|\ell|)!}} \frac{1}{w(z)} \left(\frac{\rho\sqrt{2}}{w(z)}\right)^{|\ell|} \exp\left(\frac{-\rho^2}{w^2(z)}\right) L_p^{|\ell|}\left(\frac{2\rho^2}{w^2(z)}\right) e^{i\ell\varphi} \times \exp\left(-ik\frac{\rho^2 z}{2(z_R^2+z^2)}\right) \exp\left[-i(2p+|\ell|+1)\tan^{-1}\left(\frac{z}{z_R}\right)\right],$$

where the below term:

$$L_p^{|\ell|}$$

is an associated Laguerre polynomial, and the Rayleigh range (a measure of the tightness of the focus) is:

$$z_R = k\, w^2(0)/2$$

and the beam width is:

$$w(z) = w(0)\sqrt{1+z^2/z_R^2}.$$ The azimuth phase term is:

$$e^{i\ell\varphi}$$

which provides the link to the name "Orbital Angular Momentum" from both classic electromagnetic wave theory and quantum mechanics.

Figure 7:
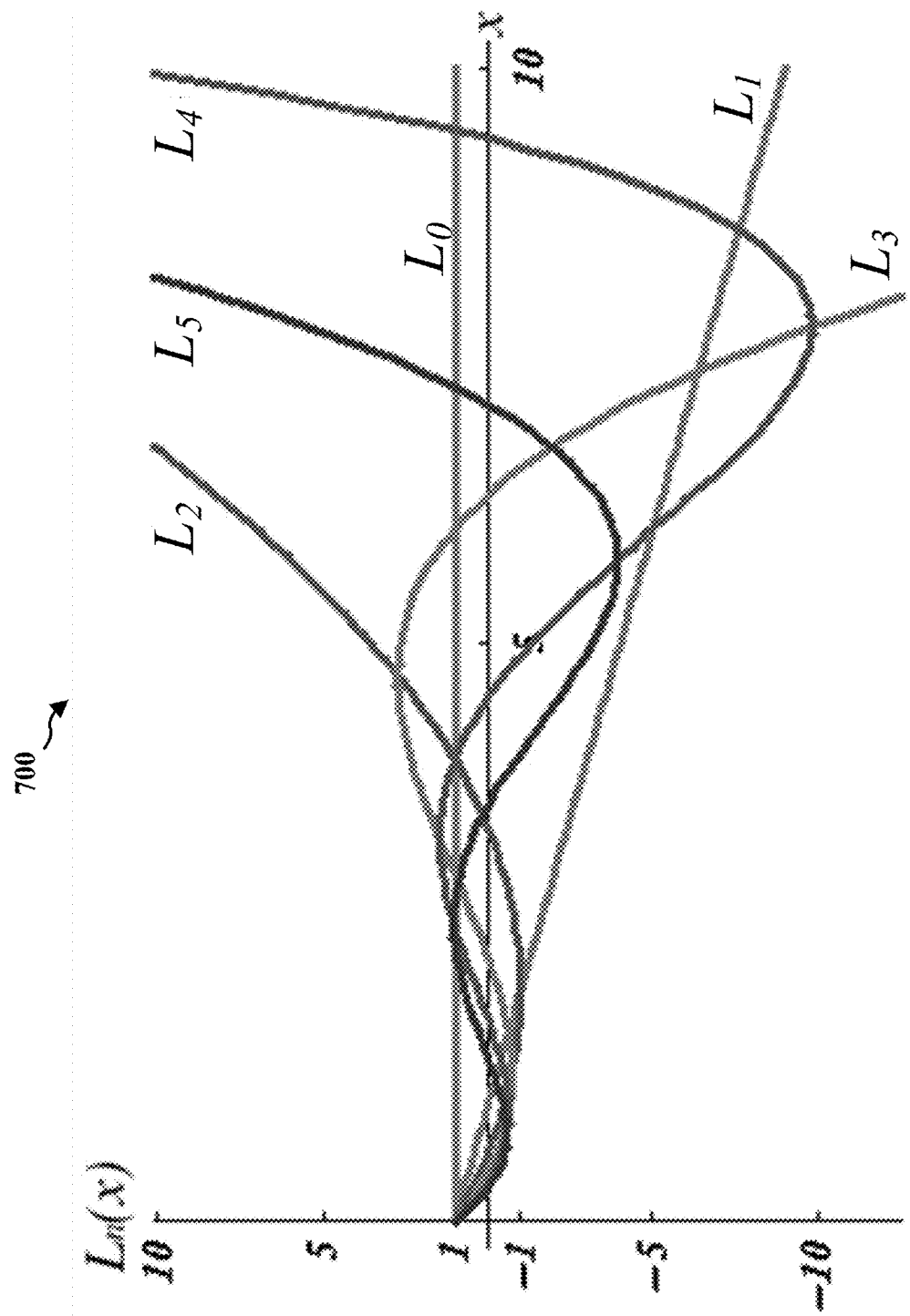
FIG. 7 is a graph of example Laguerre polynomials, according to some aspects of the present disclosure.

For z=0 at the transmitter, the Laguerre-Gaussian modes/waveforms may be estimated as:

$$u_{l,p} \propto \rho^{|\ell|} \exp(-\rho^2) L_p^{|\ell|}\left(\frac{2\rho^2}{w^2(0)}\right) e^{i\ell\varphi},$$

where the associated Laguerre polynomial is:

$$L_n^{(\alpha)}(x) = \sum_{k=0}^{n}(-1)^k \binom{n+\alpha}{n-k}\frac{x^k}{k!} \quad (n \geq 0),$$

as illustrated for example modes 700 (L0, L1, L2, L3, L4, and L5) in FIG. 7. Multiple azimuth modes, which relate to the azimuth phase term described above, are a fundamental feature of the OAM waveforms. Additionally, according to some aspects of the present disclosure, multiple radial modes may be defined through the Laguerre polynomials, which relate to the below term:

$$L_p^{|l|}\left(\frac{2\rho^2}{w^2(z)}\right)e^{il\varphi}$$

where the Laguerre polynomials are modulated by a Gaussian profile, which relates to the below term:

$$\exp=(-\rho^2)$$

and the signal waveform is naturally constrained to be effectively finite width.

In some aspects, there is partial separability between the azimuth and radial directions. Azimuth modes are independent, while radial modes are dependent on each azimuth mode. This is due to the dependence in/in the Laguerre polynomials. Also, there may be scaling factors through the Rayleigh range.

In some aspects, based on the theory of the Green function (waveforms from a single point source with the same boundary condition), the below equation:

$$\nabla^2 v + k^2 v = 0$$

is solved in an integral form, which is the equivalent of the Huygens-Fresnel principle. The signal at the receiver plane v as a function of the transmitter signal u may be written as:

$$v = \int\int u \frac{\exp(jkr)}{r} \psi dS$$

where $\psi$ is:

$$\psi = \cos\theta$$

or another function of the angle of propagation close to:

$$\cos\theta.$$

In one aspect, for example, $$\psi \approx 1.$$

In some present aspects, a solution is provided for the above integral form when the transceivers are discrete units. In an aspect, in order to provide a solution for the above integral form, eigen modes may be found by performing SVD of the channel transfer matrix, and a conjecture may be made that a Gaussian term in present in the eigenvectors.

Figure 8:
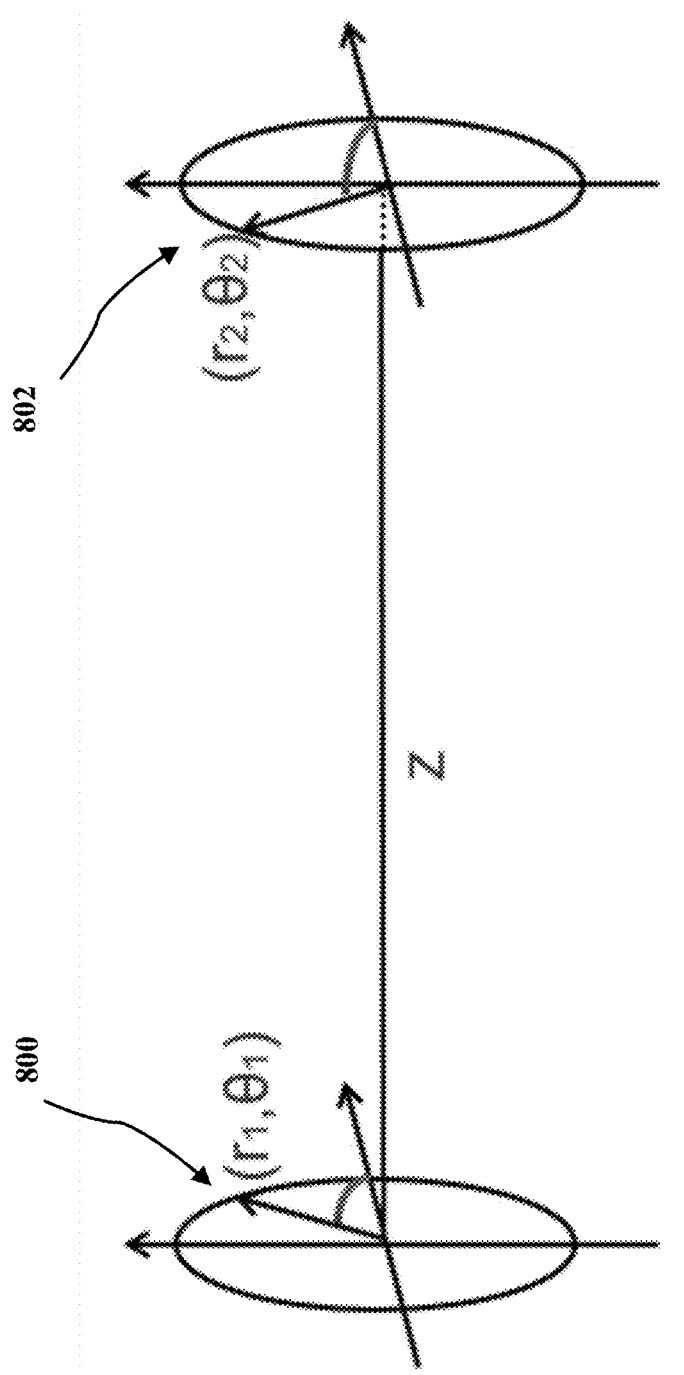
FIG. 8 is a schematic diagram of example polar coordinates of a transmit-receive antenna pair in an OAM transmitter and receiver, according to some aspects of the present disclosure.

Referring to FIG. 8, assuming N transmit antennas and N receive antennas and ignoring the cosine factor in the amplitude in the Huygens-Fresnel formula, the channel transfer matrix H corresponding to transmit antenna element m 800 and receive antenna element n 802 may be estimated based on the polar coordinates of the transmit antenna element m 800 and the receive antenna element n 802 as:

$$H_{m,n} \propto \frac{\exp\left(jk\sqrt{z^2 + (r_1\cos\theta_1 - r_2\cos\theta_2)^2 + (r_1\sin\theta_1 - r_2\sin\theta_2)^2}\right)}{\sqrt{z^2 + (r_1\cos\theta_1 - r_2\cos\theta_2)^2 + (r_1\sin\theta_1 - r_2\sin\theta_2)^2}} =$$

$$\frac{\exp\left\{jk\sqrt{z^2 + r_1^2 + r_2^2 - 2r_1 r_2 \cos(\theta_1 - \theta_2)}\right\}}{\sqrt{z^2 + r_1^2 + r_2^2 - 2r_1 r_2 \cos(\theta_1 - \theta_2)}}$$

where $H_{m,n}$ is the element of the channel transfer matrix H corresponding to the transmit antenna element m 800 and the receive antenna element n 802.

The channel transfer matrix H is cyclic, and the eigenvectors of H are discrete Fourier transform (DFT) vectors which may be written as:

$$v_\mu = \exp\left\{j\frac{2\pi\mu\nu}{N}\right\},$$

$$\mu = 0, 1, \ldots (N-1),$$

$$\nu = 0, 1, \ldots (N-1)$$

where $\mu$ is the vector index of the DFT vector, and v is the element index in each DFT vector. In an aspect, the correspondence between the DFT vectors and the OAM modes is that the $\mu$-th DFT vector is the $\mu$-th OAM waveform. In aspects with N transmit and N receive antennas, all OAM modes 0, 1, ..., N−1 are orthogonal at the receiver if any of them are transmitted, regardless of the distance z between the transmitter and the receiver and the radii of the transmitter and receiver antenna circles.

Thus, according to an aspect of the present disclosure, instead of channel estimation and feedback per antenna pair, channel estimation and feedback may be provided per circle pair. In some aspects, the transmitter and receiver planes need to be vertical to the z axis, but the transmitter and receiver antennas may have angular offset.

In an aspect, assuming the transmitter and the receiver each include M circles that each have N elements, the full channel transfer matrix H is of size (MN)*(MN). Between each pair of transmitter/receiver circles m1 and m2, the N*N channel transfer submatrix is circulant. Accordingly, the full channel matrix H may be written as:

$$H = \begin{bmatrix} H_{11} & H_{12} & & H_{1M} \\ H_{21} & H_{22} & \ldots & H_{2M} \\ \ldots & \ldots & \ldots & \ldots \\ H_{M1} & H_{M2} & \ldots & H_{MM} \end{bmatrix}$$

where $H_{m1m2}$ is an N*N circulant matrix of channel gains between the transmit circle m1 and the receive circle m2, and $(H_{m1m2})_{n1n2}$ is the complex channel gain between the transmit-receive antenna pair $n_1 n_2$.

Since DFT vectors are the eigenvectors of a circulant matrix, $$H_{m_1 m_2} e_p = h_{m_1 m_2 p} e_p$$

where $e_p$ is the p-th DFT vector below:

$$e_p = \left\{\exp\left(\frac{j2\pi pq}{N}\right)\right\},$$

$$q = 0, 1, \ldots (N-1)$$

and where the below term:

$$h_{m_1 m_2, p}$$

is the p-th complex eigenvalue which is the p-th value in the DFT of a row vector in $H_{m_1 m_2}$.

The eigenvectors of H have the form of:

$$\{x_1 e_p, x_2 e_p, \ldots x_m e_p\}^T, p=0, 1, \ldots (N-1)$$

where the weights $x_i$ are applied on a per circle basis ($x_1$ is applied to circle 1, $x_2$ is applied to circle 2, etc.). The above eigenvectors should satisfy the following:

$$\begin{bmatrix} H_{11} & H_{12} & & H_{1M} \\ H_{21} & H_{22} & \ldots & H_{2M} \\ \ldots & \ldots & \ldots & \ldots \\ H_{M1} & H_{M2} & \ldots & H_{MM} \end{bmatrix} \begin{bmatrix} x_1 e_p \\ x_2 e_p \\ \ldots \\ x_m e_p \end{bmatrix} = \begin{bmatrix} \sum_{k=1}^{M} h_{1k} x_k e_p \\ \sum_{k=1}^{M} h_{2k} x_k e_p \\ \ldots \\ \sum_{k=1}^{M} h_{Mk} x_k e_p \end{bmatrix} =$$

$$\begin{bmatrix} \sum_{k=1}^{M} h_{1k,p}(x_k/x_1)(x_1 e_p) \\ \sum_{k=1}^{M} h_{2k,p}(x_k/x_2)(x_2 e_p) \\ \ldots \\ \sum_{k=1}^{M} h_{Mk,p}(x_k/x_M)(x_M e_p) \end{bmatrix}$$

$$\sum_{k=1}^{M} h_{1k,p}(x_k/x_1) = \sum_{k=1}^{M} h_{2k,p}(x_k/x_2) = \ldots \sum_{k=1}^{M} h_{Mk,p}(x_k/x_M) = \lambda_{\mu,p}$$

which may be written in matrix form as:

$$\begin{bmatrix} h_{11,p} & h_{12,p} & \ldots & h_{1M,p} \\ h_{21,p} & h_{22,p} & \ldots & h_{2M,p} \\ \ldots & \ldots & \ldots & \ldots \\ h_{M1,p} & h_{M2,p} & \ldots & h_{MM,p} \end{bmatrix} \begin{bmatrix} x_1 \\ x_2 \\ \ldots \\ x_m \end{bmatrix} = \begin{bmatrix} \lambda_{\mu,p} x_1 \\ \lambda_{\mu,p} x_2 \\ \ldots \\ \lambda_{\mu,p} x_M \end{bmatrix}$$

$$\begin{bmatrix} h_{11,p} - \lambda_{\mu,p} & h_{12,p} & \ldots & h_{1M,p} \\ h_{21,p} & h_{22,p} - \lambda_{\mu,p} & \ldots & h_{2M,p} \\ \ldots & \ldots & \ldots & \ldots \\ h_{M1,p} & h_{M2,p} & \ldots & h_{MM,p} - \lambda_{\mu,p} \end{bmatrix} \begin{bmatrix} x_1 \\ x_2 \\ \ldots \\ x_m \end{bmatrix} = 0$$

where the below terms:

$$\lambda_{\mu,p}, \mu=0, 1, 2, \ldots, (M-1), p=0,1,2, \ldots (N-1)$$

are the eigenvalues of the below matrix:

$$\begin{bmatrix} h_{11,p} & h_{12,p} & \ldots & h_{1M,p} \\ h_{21,p} & h_{22,p} & \ldots & h_{2M,p} \\ \ldots & \ldots & & \ldots \\ h_{M1,p} & h_{M2,p} & \ldots & h_{MM,p} \end{bmatrix}$$

and where the below term:

$$h_{m_1 m_2, p}$$

is the p-th eigenvalue of the block matrix $H_{m1m2}$:

$$H_{m_1 m_2} e_p = h_{m_1 m_2, p} e_p.$$

The eigenvectors of the below full channel transfer matrix:

$$H = \begin{bmatrix} H_{11} & H_{12} & & H_{1M} \\ H_{21} & H_{22} & \ldots & H_{2M} \\ \ldots & \ldots & \ldots & \ldots \\ H_{M1} & H_{M2} & \ldots & H_{MM} \end{bmatrix}$$

have the form of:

$$\rho_{\mu,p} \otimes e_p$$

where $\otimes$ denotes the Kronecker product (e.g., outer product), and the below term:

$$\rho_{\mu,p}$$

is the μ-th eigenvector of the below matrix:

$$\begin{bmatrix} h_{11,p} & h_{12,p} & \ldots & h_{1M,p} \\ h_{21,p} & h_{22,p} & \ldots & h_{2M,p} \\ \ldots & \ldots & \ldots & \ldots \\ h_{M1,p} & h_{M2,p} & \ldots & h_{MM,p} \end{bmatrix}.$$

In one non-limiting aspect, for example, in an OAM communication with two OAM modes 1 and 2 (radial dimension of order 2), $$h_{11} + h_{12}(x_2/x_1) = h_{21}(x_1/x_2) + h_{22}$$

and assuming $x_1 = 1$, it follows that:

$$h_{11} + h_{12} x_2 = h_{21}/x_2 + h_{22}$$

$$h_{12} x_2^2 + (h_{11} - h_{22}) x_2 - h_{21} = 0$$

$$x_2 = \frac{h_{22} - h_{11}}{2h_{12}} \pm \frac{\sqrt{(h_{11} - h_{12})^2 + h_{12} h_{21}}}{2h_{12}}$$

Some aspects provide a complete beamforming solution when each one of the transmitter and the receiver includes M antenna circles that each include N antenna elements, and there is no specific requirement/constraint on the radius of each circle. In one non-limiting aspect, for example, in each one of the transmitter and the receiver, the center (e.g., the central antenna 602 in FIG. 6) is a circle of radius zero and the other circles (e.g., the UCA antenna circles 600 in FIG. 6) may be optimally placed. In an aspect, each circle includes N antenna elements (e.g., the antenna elements 604 in FIG. 6) that are uniformly placed on the circle. The alignment between the transmitter antenna and the receiver antenna is coaxial and parallel, but the antenna elements in the circles may have offsets.

The full channel transfer matrix H may be described element-wise, or may be described circle-wise using intermediate matrices $H_{m1m2}$ as below:

$$H = \begin{bmatrix} H_{11} & H_{12} & & H_{1M} \\ H_{21} & H_{22} & \ldots & H_{2M} \\ \ldots & \ldots & \ldots & \ldots \\ H_{M1} & H_{M2} & \ldots & H_{MM} \end{bmatrix}$$

where the intermediate matrix $H_{m1m2}$ is an N*N circulant matrix whose element $(H_{m1m2})_{n1n2}$ is the complex channel gain between the transmit-receive antenna pair $n_1 n_2$.

In these aspects, the MIMO modes in the complete beamforming solution for M circles of N elements are:
  Azimuth modes 0 to (N−1)
  Radial modes 0 to (M−1) for each Azimuth mode.
Specifically, for the azimuth modes 0 to (N−1) with a phase difference of:

$$2\pi p/N$$

$$p=0, 1, \ldots (N-1)$$

the beamforming vectors are eigenvectors which are the DFT vectors, and the p-th DFT vector is:

$$e_p = \left\{\exp\left(\frac{j2\pi pq}{N}\right)\right\},$$

$$q = 0, 1, \ldots (N-1)$$

For the above beamforming vectors, the beam strengths (partial) are the eigenvalues of the p-th DFT of the row vector in $H_{m1m2}$.

An aspect of the present disclosure further defines radial modes 0 to (M−1) for each of the above azimuth modes. As described above, the beamforming vectors (which are eigenvectors) and the complete beam strengths (which are eigenvalues) for these radial modes may be obtained using the below matrix:

$$\begin{bmatrix} h_{11,p} & h_{12,p} & \ldots & h_{1M,p} \\ h_{21,p} & h_{22,p} & \ldots & h_{2M,p} \\ \ldots & \ldots & & \ldots \\ h_{M1,p} & h_{M2,p} & \ldots & h_{MM,p} \end{bmatrix}$$

where the below term:

$$h_{m_1 m_2, p}$$

is the p-th eigenvalue of the block matrix $H_{m1m2}$:

$$H_{m_1 m_2} e_p = h_{m_1 m_2, p} e_p.$$

In the above beamforming solution, the radial modes may be different for each azimuth mode. The beamforming solution is partially separable since the (MN)*(MN) channel transfer matrix H degenerates into M*M circle-wise channel transfer matrices $H_{m1m2}$. The beamforming solution is sequentially separable since the azimuth modes are invariant while the radial modes are dependent on the azimuth modes. The number of modes in each direction (azimuth and radial) is independent. The number of modes in the radial direction depends on the number of circles, and the number of modes in the radial direction depends on the number of elements in the circles. This is a consequence of circular symmetry, and may correspond to the separability in solving the PDEs.

Some present aspects provide a complete beamforming solution when the transmitter and the receiver do not have the same number of circles and/or do not have the same number of antenna elements per circle. In an aspect, for example, the transmitter may have M1 circles that each have N1 antenna elements, and the receiver may have M2 circles that each have N2 antenna elements. The alignment between the transmitter antenna and the receiver antenna is coaxial and parallel, but the elements in the circles may have offsets.

The full channel transfer matrix H may be described element-wise, or may be described circle-wise as below:

$$H = \begin{bmatrix} H_{11} & H_{12} & & H_{1,M_2} \\ H_{21} & H_{22} & \ldots & H_{1,M_2} \\ \ldots & \ldots & \ldots & \ldots \\ H_{M_1 1} & H_{M_1 2} & \ldots & H_{M_1 M_2} \end{bmatrix}$$

where the intermediate matrix $H_{m1m2}$ is an N1*N2 circulant matrix whose element $(H_{m1m2})_{n1n2}$ is the complex channel gain between the transmit-receive antenna pair $n_1 n_2$.

In these aspects, the MIMO modes in the complete beamforming solution are:

Azimuth modes 0 to (N−1)

$N$=min (N1, N2)

Radial modes 0 to (M−1) for each azimuth mode $M$=min (M1, M2).

Specifically, for the azimuth modes 0 to (N−1), N=min (N1, N2), the beamforming vectors are singular vectors. At the transmitter, the p-th beamforming vector is the p-th DFT vector which is:

$e_p = \{\exp(j2\pi pq/N1)\}$ $p = 0, 1, \ldots, (N-1)$ $q = 0, 1, \ldots, (N1-1)$ $N$=min (N1, N2)

At the receiver, the p'-th beamforming vector is the p'-th DFT vector which is:

$e_p' = \{\exp(j2\pi p'q'/N2)\}$ $p' = 0, 1, \ldots, (N-1)$ $q' = 0, 1, \ldots, (N2-1)$ $N$=min (N1, N2)

For the above beamforming vectors, the beam strengths (partial) are the singular values of the p-th DFT of the row vector (or the column vector, depending on the dimension) in $H_{m1m2}$.

An aspect of the present disclosure defines radial modes 0 to (M−1), M=min (M1, M2), for each of the above azimuth modes. In these radial modes, the beamforming vectors at the transmitter may be obtained using the singular vectors of the below matrix:

$$\begin{bmatrix} h_{11,p} & h_{12,p} & \ldots & h_{1M,p} \\ h_{21,p} & h_{22,p} & \ldots & h_{2M,p} \\ \ldots & \ldots & & \ldots \\ h_{M1,p} & h_{M2,p} & \ldots & h_{MM,p} \end{bmatrix}$$

where the below term:

$$h_{m_1 m_2, p}$$

is the p-th singular value of the block matrix $H_{m1m2}$.

$$H_{m_1 m_2} e_p = h_{m_1 m_2, p} e_p.$$

The corresponding beamforming vectors at the receiver may be obtained using the singular vectors of the below matrix:

$$\begin{bmatrix} h_{11,p} & h_{12,p} & \ldots & h_{1M,p} \\ h_{21,p} & h_{22,p} & \ldots & h_{2M,p} \\ \ldots & \ldots & & \ldots \\ h_{M1,p} & h_{M2,p} & \ldots & h_{MM,p} \end{bmatrix}$$

where the below term:

$$h_{m_1 m_2, p}$$

is the p-th singular value of the block matrix $H_{m1m2}$:

$$H_{m_1 m_2} e_p = h_{m_1 m_2, p} e_p$$

The complete beam strengths for the above beamforming vectors may be obtained using the singular values of the below matrix:

$$\begin{bmatrix} h_{11,p} & h_{12,p} & \dots & h_{1M,p} \\ h_{21,p} & h_{22,p} & \dots & h_{2M,p} \\ \dots & \dots & & \dots \\ h_{M1,p} & h_{M2,p} & \dots & h_{MM,p} \end{bmatrix}.$$

In the above beamforming solution, the radial modes may be different for each azimuth mode. The beamforming solution is partially separable since the complete channel transfer matrix H degenerates into M1*M2 circle-wise channel transfer matrices $H_{m1m2}$. The beamforming solution is sequentially separable since azimuth modes are invariant while radial modes are dependent on the azimuth modes. The number of modes in each direction is independent. The number of modes in each direction depends on the number of circles and the number of elements in the circles. This is a consequence of circular symmetry, and may correspond to the separability in solving the PDEs.

Figure 9:
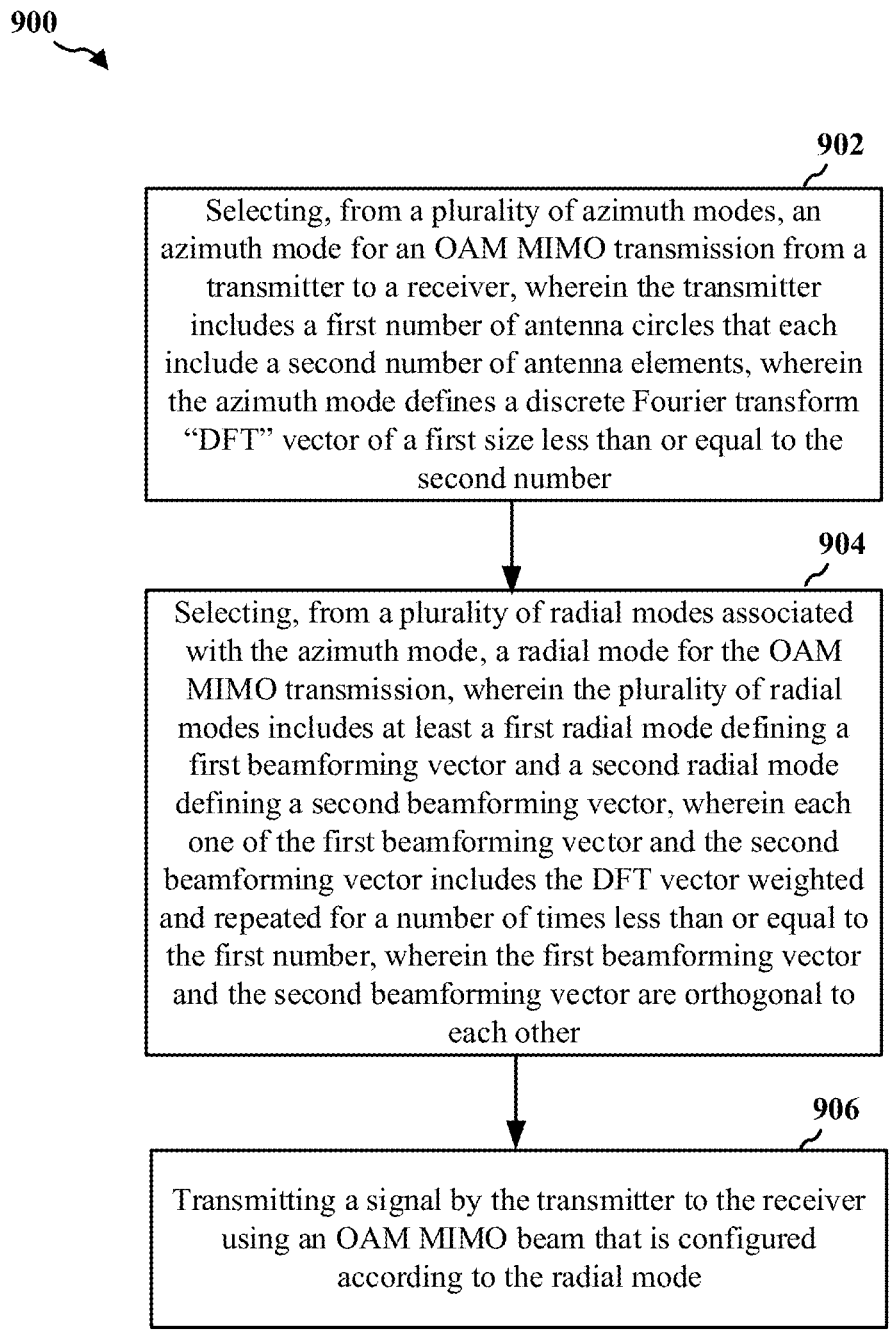
FIG. 9 is a flowchart of a first example method of OAM MIMO communication by a UE or a base station operable in the system of FIG. 1, according to some aspects of the present disclosure.
Figure 10:
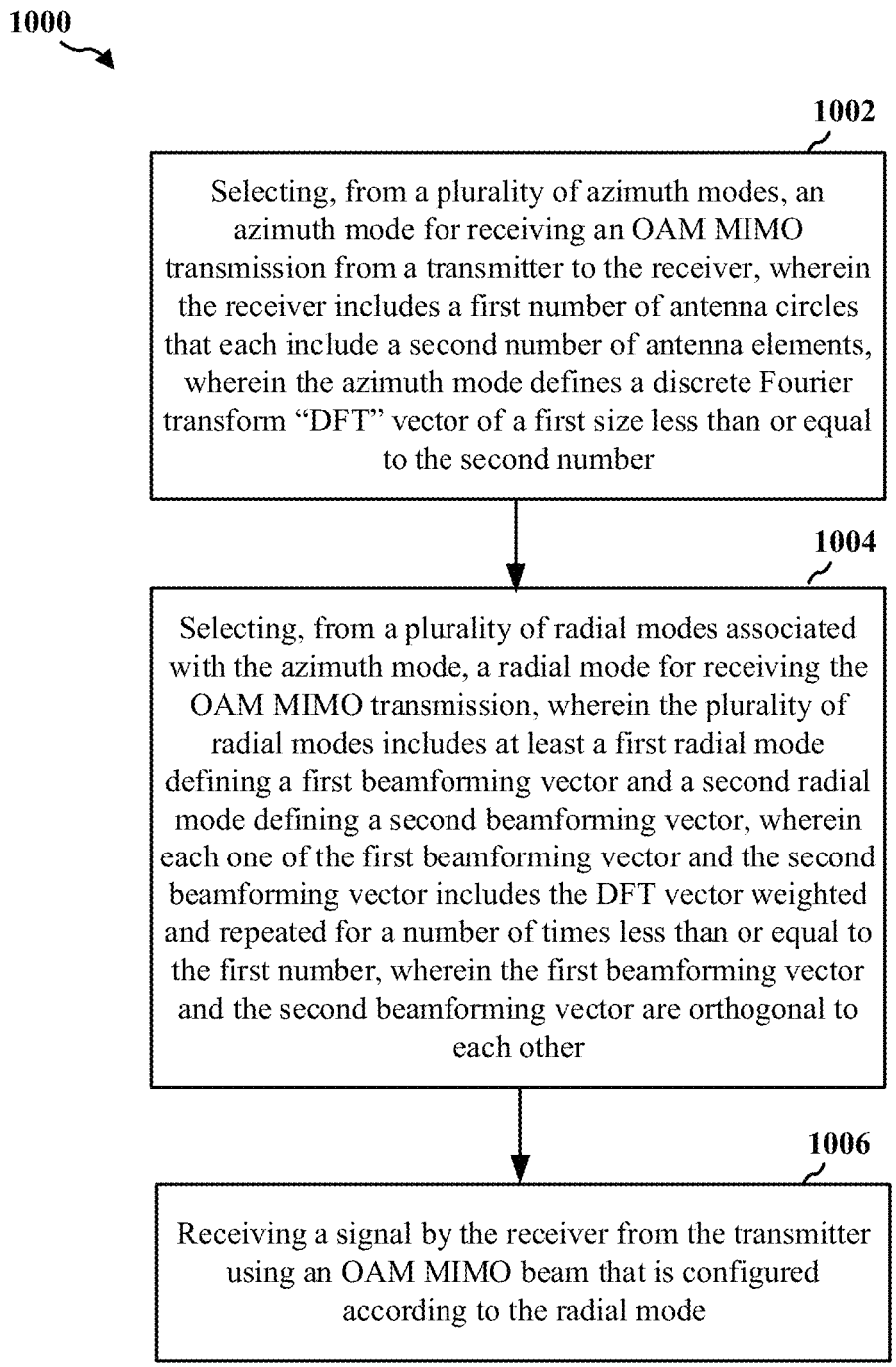
FIG. 10 is a flowchart of a second example method of OAM MIMO communication by a UE or a base station operable in the system of FIG. 1, according to some aspects of the present disclosure.

Referring to FIGS. 9 and 10, each one of example methods 900 and 1000 of OAM MIMO communication may be performed by a UE 104 and/or a base station 102, which may include one or more components as discussed in FIGS. 1-8, and which may operate to perform OAM MIMO beamforming as discussed above with reference to FIGS. 1-8.

Although the below description of the methods 900 and 1000 is provided with reference to a base station 102 and/or components of a base station 102 such as antennas 1265, RF front end 1288, transceiver 1202, processor 1212, memory 1216, modem 1240, and/or OAM MIMO beamforming component 127, each one of the methods 900 and 1000 is similarly applicable to and executable by a UE 104 and/or same/similar components of a UE 104 such as antennas 1165, RF front end 1188, transceiver 1102, processor 1112, memory 1116, modem 1140, and/or OAM MIMO beamforming component 127. In some further alternative aspects, each one of the methods 900 and 1000 is applicable to and may be executed by any other type of tx/rx node 310, 350. In some non-limiting aspects, for example, an OAM transmitter may be a UE 104, a base station 102, etc., and an OAM receiver may also be a UE 104, a base station 102, etc. For example, for wireless backhaul transmission, OAM is applicable for communication between a base station and a relay node. As another example, for fixed wireless access, OAM is applicable for communication between a base station and a fixed UE, e.g., a CPE. As another example, for inter-device transmission, OAM is applicable for communication between two fixed UEs, e.g., inter-server connection in a data center.

At 902, the method 900 of OAM MIMO communication at a transmitter includes selecting, from a plurality of azimuth modes, an azimuth mode for an OAM MIMO transmission from the transmitter to a receiver, wherein the transmitter includes a first number of antenna circles that each include a second number of antenna elements, wherein the azimuth mode defines a DFT vector of a first size less than or equal to the second number. For example, in an aspect, the base station 102 may operate one or any combination of antennas 1265, RF front end 1288, transceiver 1202, processor 1212, memory 1216, modem 1240, or OAM MIMO beamforming component 127 to select, from a plurality of azimuth modes, an azimuth mode for an OAM MIMO transmission from the transmitter to a receiver, wherein the transmitter includes a first number of antenna circles that each include a second number of antenna elements, wherein the azimuth mode defines a DFT vector of a first size less than or equal to the second number. Accordingly, in an aspect, the base station 102, antennas 1265, RF front end 1288, transceiver 1202, processor 1212, memory 1216, modem 1240, and/or OAM MIMO beamforming component 127 may provide means for selecting, from a plurality of azimuth modes, an azimuth mode for an OAM MIMO transmission from the transmitter to a receiver, wherein the transmitter includes a first number of antenna circles that each include a second number of antenna elements, wherein the azimuth mode defines a DFT vector of a first size less than or equal to the second number.

For example, in an aspect, the selecting at 902 may include the base station 102 operating as an OAM transmitter 504 and executing the OAM MIMO beamforming component 127 to select an azimuth mode from a plurality of azimuth modes 121 for an OAM MIMO transmission from the OAM transmitter 504 to an OAM receiver 508. The base station 102 (e.g., the OAM transmitter 504) includes a first number (e.g., M1) of antenna circles (e.g., UCA antenna circles 600) that each include a second number (e.g., N1) of antenna elements 604. The azimuth mode selected at 902 defines a DFT vector of a size (e.g., N) that is less than or equal to the second number (e.g., less than or equal to N1 which is the number of antenna elements in each circle at the OAM transmitter 504). Further details of the DFT vector are provided below with reference to various example aspects, where in some aspects the OAM transmitter 504 and the OAM receiver 508 have the same number of circles and the same number of antenna elements per circle (in which case N=N1), and also where in some other aspects the OAM transmitter 504 and the OAM receiver 508 differ in the number of circles and/or in the number of antenna elements per circle (in which case N is the smaller one of the number of elements per circle at the transmitter and the number of elements per circle at the receiver).

At 904, the method 900 includes selecting, from a plurality of radial modes associated with the azimuth mode, a radial mode for the OAM MIMO transmission, wherein the plurality of radial modes includes at least a first radial mode defining a first beamforming vector and a second radial mode defining a second beamforming vector, wherein each one of the first beamforming vector and the second beamforming vector includes the DFT vector weighted and repeated for a number of times less than or equal to the first number, wherein the first beamforming vector and the second beamforming vector are orthogonal to each other. For example, in an aspect, the base station 102 may operate one or any combination of antennas 1265, RF front end 1288, transceiver 1202, processor 1212, memory 1216, modem 1240, or OAM MIMO beamforming component 127 to select, from a plurality of radial modes associated with the azimuth mode, a radial mode for the OAM MIMO transmission, wherein the plurality of radial modes includes at least a first radial mode defining a first beamforming vector and a second radial mode defining a second beamforming vector, wherein each one of the first beamforming vector and the second beamforming vector includes the DFT vector weighted and repeated for a number of times less than or equal to the first number, wherein the first beamforming vector and the second beamforming vector are orthogonal to each other. Accordingly, in an aspect, the base station 102, antennas 1265, RF front end 1288, transceiver 1202, processor 1212, memory 1216, modem 1240, and/or OAM MIMO beamforming component 127 may provide means for selecting, from a plurality of radial modes associated with the azimuth mode, a radial mode for the OAM MIMO transmission, wherein the plurality of radial modes includes at least a first radial mode defining a first beamforming vector and a second radial mode defining a second beamforming vector, wherein each one of the first beamforming vector and the second beamforming vector includes the DFT vector weighted and repeated for a number of times less than or equal to the first number, wherein the first beamforming vector and the second beamforming vector are orthogonal to each other.

For example, in an aspect, the selecting at 904 may include the base station 102 operating as an OAM transmitter 504 and executing the OAM MIMO beamforming component 127 to select, from a plurality of radial modes 124 associated with the azimuth mode that was selected at 902 from the plurality of azimuth modes 121, a radial mode for OAM MIMO transmission. The plurality of radial modes 124 defines a plurality of respective beamforming vectors 125, and includes at least a first radial mode defining a first beamforming vector and a second radial mode defining a second beamforming vector. Each one of the first beamforming vector and the second beamforming vector includes the DFT vector (which was defined by the azimuth mode selected at 902) weighted and repeated for a number of times (e.g., M) that is less than or equal to the first number (e.g., M1 which is the number of circles at the OAM transmitter 504). The first beamforming vector and the second beamforming vector are orthogonal to each other.

In some aspects, each one of the first beamforming vector and the second beamforming vector is a Kronecker product of a weight vector and the DFT vector, wherein the weight vector has a size that is less than or equal to the first number (e.g., M1 which is the number of circles at the OAM transmitter 504). Further details of the beamforming vectors are provided below with reference to various example aspects, where in some aspects the OAM transmitter 504 and the OAM receiver 508 have the same number of circles and the same number of antenna elements per circle (in which case M=M1, and the beamforming vectors are eigenvectors), and also where in some other aspects the OAM transmitter 504 and the OAM receiver 508 differ in the number of circles and/or in the number of antenna elements per circle (in which case M is the smaller one of the number of circles at the transmitter and the number of circles at the receiver, and the beamforming vectors are singular vectors).

At 906, the method 900 includes transmitting a signal by the transmitter to the receiver using an OAM MIMO beam that is configured according to the radial mode. For example, in an aspect, the base station 102 may operate one or any combination of antennas 1265, RF front end 1288, transceiver 1202, processor 1212, memory 1216, modem 1240, or OAM MIMO beamforming component 127 to transmit a signal by the transmitter to the receiver using an OAM MIMO beam that is configured according to the radial mode. Accordingly, in an aspect, the base station 102, antennas 1265, RF front end 1288, transceiver 1202, processor 1212, memory 1216, modem 1240, and/or OAM MIMO beamforming component 127 may provide means for transmitting a signal by the transmitter to the receiver using an OAM MIMO beam that is configured according to the radial mode.

For example, in an aspect, the transmitting at 906 may include the base station 102 operating as an OAM transmitter 504 to transmit a signal via the plurality of UCA antenna circles 600 to an OAM receiver 508 using an OAM MIMO beam (e.g., 182) that is configured according to the radial mode selected at 904.

In some aspects, the first number of antenna circles at the OAM transmitter 504 are concentric, and each circle in the first number of antenna circles comprises a UCA antenna circle (e.g., UCA antenna circles 600).

In some aspects, the OAM receiver 508 may also comprise a third number (e.g., M2) of antenna circles 600 that each include a fourth number (e.g., N2) of antenna elements 604, and the antenna circles at the OAM transmitter 504 and the antenna circles at the OAM receiver 508 are coaxial. In these aspects, the size of the DFT vector defined by the azimuth mode that was selected at 902 is N=min (N1, N2).

Specifically, some aspects define azimuth modes 0 to (N−1), N=min (N1, N2). At the OAM transmitter 504, the p-th azimuth mode defines the p-th DFT vector which may be written as:

$e_p = \{\exp(j2\pi pq/N1)\}$ $p = 0, 1, \ldots, (N-1)$ $q = 0, 1, \ldots, (N1-1)$ $N = \min(N1, N2)$.

An aspect defines radial modes 0 to (M−1), M=min (M1, M2) for each of these azimuth modes. For the azimuth mode that was selected at 902, the weight vector used at 904 to obtain the radial mode is a singular vector of a matrix, wherein each element of the matrix comprises a singular value of a channel gain matrix between a pair of transmit-receive antenna circles of the transmitter and the receiver, wherein, for the singular value, the DFT vector is a corresponding singular vector of the channel gain matrix. Specifically, the radial mode defines a beamforming vector for the OAM transmitter 504, and the weight vector used to obtain the beamforming vector (e.g., by a Kronecker product of the weight vector and the DFT vector defined by the azimuth mode) is the singular vector of the below matrix:

$$\begin{bmatrix} h_{11,p} & h_{12,p} & \ldots & h_{1M,p} \\ h_{21,p} & h_{22,p} & \ldots & h_{2M,p} \\ \ldots & \ldots & & \ldots \\ h_{M1,p} & h_{M2,p} & \ldots & h_{MM,p} \end{bmatrix}$$

where the below term:

$h_{m_1 m_2, p}$ is the p-th singular value of the block matrix $H_{m1m2}$.

$H_{m_1 m_2} e_p = h_{m_1 m_2, p} e_p$, and where the intermediate matrix $H_{m1m2}$ is an N1*N2 circulant matrix whose element $(H_{m_1 m_2})_{n1n2}$ is the complex channel gain between the transmit-receive antenna pair n1n2 (between the antenna circle n1 at the OAM transmitter 504 and the antenna circle n2 at the OAM receiver 508).

Also, in aspects where N1 is equal to N2 and M1 is equal to M2 (in aspects where the OAM transmitter 504 and the OAM receiver 508 have the same number M of antenna circles and the same number N of antenna elements per circle), the size of the DFT vector defined by the azimuth mode that was selected at 902 is N=N1=N2, and each one of the first beamforming vector and the second beamforming vector associated with a respective radial mode includes the DFT vector weighted and repeated for a number of times M that is equal to M1 and M2. For the azimuth modes 0 to (N−1) with a phase difference of:

$2\pi p/N$ $p = 0, 1, \ldots (N-1)$, the beamforming vectors are eigenvectors which are the DFT vectors, and the p-th DFT vector is:

$$e_p = \left\{\exp\left(\frac{j2\pi pq}{N}\right)\right\},$$
$$q = 0, 1, \ldots (N-1).$$

Some aspects define radial modes 0 to (M−1) for these azimuth modes. In some aspects, the radial modes include a first radial mode defining a first beamforming vector and a second radial mode defining a second beamforming vector. Each one of the first beamforming vector and the second beamforming vector is a Kronecker product of a weight vector and the DFT vector, wherein the weight vector has a size that is equal to M, wherein each weight in the weight vector is associated with a circle in the M antenna circles at the OAM transmitter 504. For example, in an aspect, each one of the first beamforming vector and the second beamforming vector defined by a respective radial mode may be written as the following Kronecker product:

$$\{x_1 e_p, x_2 e_p, \ldots x_m e_p\}^T, p=0, 1, \ldots (N-1)$$

where the weights $x_i$ are applied on a per circle basis (e.g., $x_1$ is applied to circle 1, $x_2$ is applied to circle 2, etc.). Accordingly, each one of the first beamforming vector and the second beamforming vector includes the DFT vector (which was defined by the azimuth mode selected at 902) weighted (e.g., by weights $x_i$) and repeated for a number of times (e.g., M).

In aspects where N1 is equal to N2 (in aspects where the OAM transmitter 504 and the OAM receiver 508 have the same number of antenna circles), the above weight vector is an eigenvector of a matrix, wherein each element of the matrix comprises an eigenvalue of a channel gain matrix between a pair of transmit-receive antenna circles of the transmitter and the receiver, wherein, for the eigenvalue, the DFT vector is a corresponding eigenvector of the channel gain matrix. Specifically, some aspects define radial modes 0 to (M−1) for each azimuth mode. The beamforming vectors (which are eigenvectors) and the complete beam strengths (which are eigenvalues) for these radial modes may be obtained using the below matrix:

$$\begin{bmatrix} h_{11,p} & h_{12,p} & & h_{1M,p} \\ h_{21,p} & h_{22,p} & \ldots & h_{2M,p} \\ \ldots & \ldots & \ldots & \ldots \\ h_{M1,p} & h_{M2,p} & \ldots & h_{MM,p} \end{bmatrix}$$

$$\begin{bmatrix} h_{11,p} & h_{12,p} & \ldots & h_{1M,p} \\ h_{21,p} & h_{22,p} & \ldots & h_{2M,p} \\ \ldots & \ldots & & \ldots \\ h_{M1,p} & h_{M2,p} & \ldots & h_{MM,p} \end{bmatrix}$$

where the below term:

$$h_{m_1 m_2, p}$$

is the p-th eigenvalue of the block matrix $H_{m_1 m_2}$:

$$H_{m_1 m_2} e_p = h_{m_1 m_2, p} e_p.$$

Specifically, the weight vector $\{x_1, x_2, \ldots, x_m\}$ that is used to obtain the beamforming vector (e.g., by a Kronecker product of the weight vector and the DFT vector defined by the azimuth mode) is an eigenvector of the below matrix:

$$\begin{bmatrix} h_{11,p} & h_{12,p} & \ldots & h_{1M,p} \\ h_{21,p} & h_{22,p} & \ldots & h_{2M,p} \\ \ldots & \ldots & & \ldots \\ h_{M1,p} & h_{M2,p} & \ldots & h_{MM,p} \end{bmatrix}.$$

As a result, the beamforming vectors are the eigenvectors of the below full channel transfer matrix:

$$H = \begin{bmatrix} H_{11} & H_{12} & & H_{1M} \\ H_{21} & H_{22} & \ldots & H_{2M} \\ \ldots & \ldots & \ldots & \ldots \\ H_{M1} & H_{M2} & \ldots & H_{MM} \end{bmatrix}$$

and may be written as:

$$\rho_{\mu, p} \otimes e_p$$

where $\otimes$ denotes the Kronecker product (e.g., outer product), and the below term:

$$\rho_{\mu, p}$$

is the μ-th eigenvector of the below matrix:

$$\begin{bmatrix} h_{11,p} & h_{12,p} & \ldots & h_{1M,p} \\ h_{21,p} & h_{22,p} & \ldots & h_{2M,p} \\ \ldots & \ldots & & \ldots \\ h_{M1,p} & h_{M2,p} & \ldots & h_{MM,p} \end{bmatrix}.$$

Referring to FIG. 10, at 1002, the method 1000 of OAM MIMO communication at a transmitter includes selecting, from a plurality of azimuth modes, an azimuth mode for receiving an OAM MIMO transmission from a transmitter to the receiver, wherein the receiver includes a first number of antenna circles that each include a second number of antenna elements, wherein the azimuth mode defines a DFT vector of a first size less than or equal to the second number. For example, in an aspect, the base station 102 may operate one or any combination of antennas 1265, RF front end 1288, transceiver 1202, processor 1212, memory 1216, modem 1240, or OAM MIMO beamforming component 127 to select, from a plurality of azimuth modes, an azimuth mode for receiving an OAM MIMO transmission from a transmitter to the receiver, wherein the receiver includes a first number of antenna circles that each include a second number of antenna elements, wherein the azimuth mode defines a DFT vector of a first size less than or equal to the second number. Accordingly, in an aspect, the base station 102, antennas 1265, RF front end 1288, transceiver 1202, processor 1212, memory 1216, modem 1240, and/or OAM MIMO beamforming component 127 may provide means for selecting, from a plurality of azimuth modes, an azimuth mode for receiving an OAM MIMO transmission from a transmitter to the receiver, wherein the receiver includes a first number of antenna circles that each include a second number of antenna elements, wherein the azimuth mode defines a DFT vector of a first size less than or equal to the second number.

For example, in an aspect, the selecting at 1002 may include the base station 102 operating as an OAM receiver 508 and executing the OAM MIMO beamforming component 127 to select an azimuth mode from a plurality of azimuth modes 121 for receiving an OAM MIMO transmission from an OAM transmitter 504. The base station 102 (e.g., the OAM receiver 508) includes a first number (e.g., M2) of antenna circles (e.g., UCA antenna circles 600) that each include a second number (e.g., N2) of antenna elements 604. The azimuth mode selected at 1002 defines a DFT vector of a size (e.g., N) that is less than or equal to the second number (e.g., less than or equal to N1 which is the number of antenna elements in each circle at the OAM receiver 508). Further details of the DFT vector are provided below with reference to various example aspects, where in some aspects the OAM transmitter 504 and the OAM receiver 508 have the same number of circles and the same number of antenna elements per circle (in which case N=N2), and also where in some other aspects the OAM transmitter 504 and the OAM receiver 508 differ in the number of circles and/or in the number of antenna elements per circle (in which case N is the smaller one of the number of elements per circle at the transmitter and the number of elements per circle at the receiver).

At 1004, the method 1000 includes selecting, from a plurality of radial modes associated with the azimuth mode, a radial mode for receiving the OAM MIMO transmission, wherein the plurality of radial modes includes at least a first radial mode defining a first beamforming vector and a second radial mode defining a second beamforming vector, wherein each one of the first beamforming vector and the second beamforming vector includes the DFT vector weighted and repeated for a number of times less than or equal to the first number, wherein the first beamforming vector and the second beamforming vector are orthogonal to each other. For example, in an aspect, the base station 102 may operate one or any combination of antennas 1265, RF front end 1288, transceiver 1202, processor 1212, memory 1216, modem 1240, or OAM MIMO beamforming component 127 to select, from a plurality of radial modes associated with the azimuth mode, a radial mode for receiving the OAM MIMO transmission, wherein the plurality of radial modes includes at least a first radial mode defining a first beamforming vector and a second radial mode defining a second beamforming vector, wherein each one of the first beamforming vector and the second beamforming vector includes the DFT vector weighted and repeated for a number of times less than or equal to the first number, wherein the first beamforming vector and the second beamforming vector are orthogonal to each other. Accordingly, in an aspect, the base station 102, antennas 1265, RF front end 1288, transceiver 1202, processor 1212, memory 1216, modem 1240, and/or OAM MIMO beamforming component 127 may provide means for selecting, from a plurality of radial modes associated with the azimuth mode, a radial mode for receiving the OAM MIMO transmission, wherein the plurality of radial modes includes at least a first radial mode defining a first beamforming vector and a second radial mode defining a second beamforming vector, wherein each one of the first beamforming vector and the second beamforming vector includes the DFT vector weighted and repeated for a number of times less than or equal to the first number, wherein the first beamforming vector and the second beamforming vector are orthogonal to each other.

For example, in an aspect, the selecting at 1004 may include the base station 102 operating as an OAM receiver 508 and executing the OAM MIMO beamforming component 127 to select, from a plurality of radial modes 124 associated with the azimuth mode that was selected at 1002 from the plurality of azimuth modes 121, a radial mode for receiving the OAM MIMO transmission. The plurality of radial modes 124 defines a plurality of respective beamforming vectors 125, and includes at least a first radial mode defining a first beamforming vector and a second radial mode defining a second beamforming vector. Each one of the first beamforming vector and the second beamforming vector includes the DFT vector (which was defined by the azimuth mode selected at 1002) weighted and repeated for a number of times (e.g., M) that is less than or equal to the first number (e.g., M2 which is the number of circles at the OAM receiver 508). The first beamforming vector and the second beamforming vector are orthogonal to each other.

In some aspects, each one of the first beamforming vector and the second beamforming vector is a Kronecker product of a weight vector and the DFT vector, wherein the weight vector has a size that is less than or equal to the first number (e.g., M2 which is the number of circles at the OAM receiver 508). Further details of the beamforming vectors are provided below with reference to various example aspects, where in some aspects the OAM transmitter 504 and the OAM receiver 508 have the same number of circles and the same number of antenna elements per circle (in which case M=M2, and the beamforming vectors are eigenvectors), and also where in some other aspects the OAM transmitter 504 and the OAM receiver 508 differ in the number of circles and/or in the number of antenna elements per circle (in which case M is the smaller one of the number of circles at the transmitter and the number of circles at the receiver, and the beamforming vectors are singular vectors).

At 1006, the method 1000 includes receiving a signal by the receiver from the transmitter using an OAM MIMO beam that is configured according to the radial mode. For example, in an aspect, the base station 102 may operate one or any combination of antennas 1265, RF front end 1288, transceiver 1202, processor 1212, memory 1216, modem 1240, or OAM MIMO beamforming component 127 to receive a signal by the receiver from the transmitter using an OAM MIMO beam that is configured according to the radial mode. Accordingly, in an aspect, the base station 102, antennas 1265, RF front end 1288, transceiver 1202, processor 1212, memory 1216, modem 1240, and/or OAM MIMO beamforming component 127 may provide means for receiving a signal by the receiver from the transmitter using an OAM MIMO beam that is configured according to the radial mode.

For example, in an aspect, the receiving at 1006 may include the base station 102 operating as an OAM receiver 508 to receive a signal via the plurality of UCA antenna circles 600 from an OAM transmitter 504 using an OAM MIMO beam (e.g., 182) that is configured according to the radial mode selected at 1004.

In some aspects, the first number of antenna circles at the OAM receiver 508 are concentric, and each circle in the first number of antenna circles comprises a UCA antenna circle (e.g., UCA antenna circles 600).

In some aspects, the OAM transmitter 504 may also comprise a third number (e.g., M1) of antenna circles 600 that each include a fourth number (e.g., N1) of antenna elements 604, and the antenna circles at the OAM transmitter 504 and the antenna circles at the OAM receiver 508 are coaxial. In these aspects, the size of the DFT vector defined by the azimuth mode that was selected at 1002 is N=min(N1, N2).

Specifically, some aspects define azimuth modes 0 to (N−1), N=min (N1, N2). At the OAM receiver 508, the p'-th azimuth mode defines the p'-th DFT vector which may be written as:

$$e_p' = \{\exp(j2\pi p' q'/N2)\}$$

$$p' = 0, 1, \ldots, (N-1)$$

$$q' = 0, 1, \ldots, (N2-1)$$

$$N = \min(N1, N2).$$

An aspect defines radial modes 0 to (M−1), M=min (M1, M2) for each of these azimuth modes. For the azimuth mode that was selected at 1002, the weight vector used at 1004 to obtain the radial mode is a singular vector of a matrix, wherein each element of the matrix comprises a singular value of a channel gain matrix between a pair of transmit-receive antenna circles of the transmitter and the receiver, wherein, for the singular value, the DFT vector is a corresponding singular vector of the channel gain matrix. Specifically, the radial mode defines a beamforming vector for the OAM receiver 508, and the weight vector used to obtain the beamforming vector (e.g., by a Kronecker product of the weight vector and the DFT vector defined by the azimuth mode) is the singular vector of the below matrix:

$$\begin{bmatrix} h_{11,p} & h_{12,p} & \ldots & h_{1M,p} \\ h_{21,p} & h_{22,p} & \ldots & h_{2M,p} \\ \ldots & \ldots & & \ldots \\ h_{M1,p} & h_{M2,p} & \ldots & h_{MM,p} \end{bmatrix}$$

where the below term:

$$h_{m_1 m_2, p}$$

is the p-th singular value of the block matrix $H_{m_1 m_2}$.

$$H_{m_1 m_2} e_p = h_{m_1 m_2, p} e_p,$$

and where the intermediate matrix $H_{m_1 m_2}$ is an N1*N2 circulant matrix whose element $(H_{m_1 m_2})n1n2$ is the complex channel gain between the transmit-receive antenna pair n1n2 (between the antenna circle n1 at the OAM transmitter 504 and the antenna circle n2 at the OAM receiver 508).

Also, in aspects where N1 is equal to N2 and M1 is equal to M2 (in aspects where the OAM transmitter 504 and the OAM receiver 508 have the same number M of antenna circles and the same number N of antenna elements per circle), the size of the DFT vector defined by the azimuth mode that was selected at 1002 is N=N1=N2, and each one of the first beamforming vector and the second beamforming vector associated with a respective radial mode includes the DFT vector weighted and repeated for a number of times M that is equal to M1 and M2. For the azimuth modes 0 to (N−1) with a phase difference of:

$$2\pi p/N$$

$$p = 0, 1, \ldots (N-1),$$

the beamforming vectors are eigenvectors which are the DFT vectors, and the p-th DFT vector is:

$$e_p = \left\{ \exp\left(\frac{j2\pi pq}{N}\right) \right\},$$

$$q = 0, 1, \ldots (N-1).$$

Some aspects define radial modes 0 to (M−1) for these azimuth modes. In some aspects, the radial modes include a first radial mode defining a first beamforming vector and a second radial mode defining a second beamforming vector. Each one of the first beamforming vector and the second beamforming vector is a Kronecker product of a weight vector and the DFT vector, wherein the weight vector has a size that is equal to M, wherein each weight in the weight vector is associated with a circle in the M antenna circles at the OAM receiver 508. For example, in an aspect, each one of the first beamforming vector and the second beamforming vector defined by a respective radial mode may be written as the following Kronecker product:

$$\{x_1 e_p, x_2 e_p, \ldots x_m e_p\}^T, p = 0, 1, \ldots (N-1)$$

where the weights $x_i$ are applied on a per circle basis (e.g., $x_1$ is applied to circle 1, $x_2$ is applied to circle 2, etc.). Accordingly, each one of the first beamforming vector and the second beamforming vector includes the DFT vector (which was defined by the azimuth mode selected at 1002) weighted (e.g., by weights $x_i$) and repeated for a number of times (e.g., M).

In aspects where N1 is equal to N2 (in aspects where the OAM transmitter 504 and the OAM receiver 508 have the same number of antenna circles), the above weight vector is an eigenvector of a matrix, wherein each element of the matrix comprises an eigenvalue of a channel gain matrix between a pair of transmit-receive antenna circles of the transmitter and the receiver, wherein, for the eigenvalue, the DFT vector is a corresponding eigenvector of the channel gain matrix. Specifically, some aspects define radial modes 0 to (M−1) for each azimuth mode. The beamforming vectors (which are eigenvectors) and the complete beam strengths (which are eigenvalues) for these radial modes may be obtained using the below matrix:

$$\begin{bmatrix} h_{11,p} & h_{12,p} & \ldots & h_{1M,p} \\ h_{21,p} & h_{22,p} & \ldots & h_{2M,p} \\ \ldots & \ldots & & \ldots \\ h_{M1,p} & h_{M2,p} & \ldots & h_{MM,p} \end{bmatrix}$$

where the below term:

$$h_{m_1 m_2, p}$$

is the p-th eigenvalue of the block matrix $H_{m_1 m_2}$:

$$H_{m_1 m_2} e_p = h_{m_1 m_2, p} e_p.$$

Specifically, the weight vector $\{x_1, x_2, \ldots, x_m\}$ that is used to obtain the beamforming vector (e.g., by a Kronecker product of the weight vector and the DFT vector defined by the azimuth mode) is an eigenvector of the below matrix:

$$\begin{bmatrix} h_{11,p} & h_{12,p} & \ldots & h_{1M,p} \\ h_{21,p} & h_{22,p} & \ldots & h_{2M,p} \\ \ldots & \ldots & & \ldots \\ h_{M1,p} & h_{M2,p} & \ldots & h_{MM,p} \end{bmatrix}.$$

As a result, the beamforming vectors are the eigenvectors of the below full channel transfer matrix:

$$H = \begin{bmatrix} H_{11} & H_{12} & & H_{1M} \\ H_{21} & H_{22} & \ldots & H_{2M} \\ \ldots & \ldots & \ldots & \ldots \\ H_{M1} & H_{M2} & \ldots & H_{MM} \end{bmatrix}$$

and may be written as:

$$p_{\mu,p} \otimes e_p$$

where $\otimes$ denotes the Kronecker product (e.g., outer product), and the below term:

$$p_{\mu,p}$$

is the µ-th eigenvector of the below matrix:

$$\begin{bmatrix} h_{11,p} & h_{12,p} & \ldots & h_{1M,p} \\ h_{21,p} & h_{22,p} & \ldots & h_{2M,p} \\ \ldots & \ldots & \ldots & \ldots \\ h_{M1,p} & h_{M2,p} & \ldots & h_{MM,p} \end{bmatrix}.$$

Figure 11:
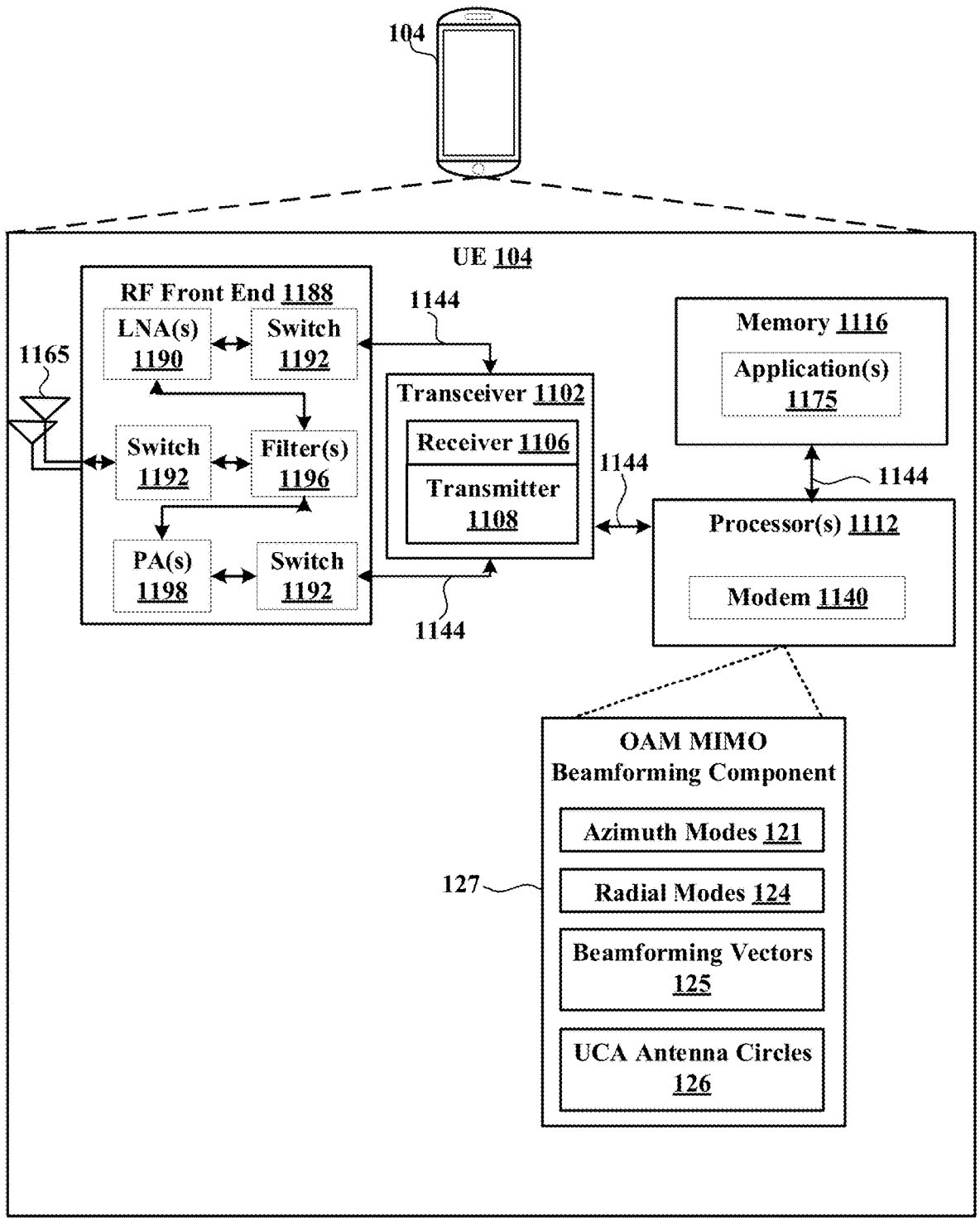
FIG. 11 is a block diagram of an example UE, according to some aspects of the present disclosure.

Referring to FIG. 11, one example of an implementation of UE 104 may include a variety of components, some of which have already been described above and are described further herein, including components such as one or more processors 1112 and memory 1116 and transceiver 1102 in communication via one or more buses 1144, which may operate in conjunction with modem 1140 and/or OAM MIMO beamforming component 127 for performing OAM MIMO beamforming as described herein.

In an aspect, the one or more processors 1112 can include a modem 1140 and/or can be part of the modem 1140 that uses one or more modem processors. Thus, the various functions related to OAM MIMO beamforming component 127 may be included in modem 1140 and/or processors 1112 and, in an aspect, can be executed by a single processor, while in other aspects, different ones of the functions may be executed by a combination of two or more different processors. For example, in an aspect, the one or more processors 1112 may include any one or any combination of a modem processor, or a baseband processor, or a digital signal processor, or a transmit processor, or a receiver processor, or a transceiver processor associated with transceiver 1102. In other aspects, some of the features of the one or more processors 1112 and/or modem 1140 associated with OAM MIMO beamforming component 127 may be performed by transceiver 1102.

Also, memory 1116 may be configured to store data used herein and/or local versions of applications 1175 or OAM MIMO beamforming component 127 and/or one or more of its subcomponents being executed by at least one processor 1112. Memory 1116 can include any type of computer-readable medium usable by a computer or at least one processor 1112, such as random access memory (RAM), read only memory (ROM), tapes, magnetic discs, optical discs, volatile memory, non-volatile memory, and any combination thereof. In an aspect, for example, memory 1116 may be a non-transitory computer-readable storage medium that stores one or more computer-executable codes defining OAM MIMO beamforming component 127 and/or one or more of its subcomponents, and/or data associated therewith, when UE 104 is operating at least one processor 1112 to execute OAM MIMO beamforming component 127 and/or one or more of its subcomponents.

Transceiver 1102 may include at least one receiver 1106 and at least one transmitter 1108. Receiver 1106 may include hardware and/or software executable by a processor for receiving data, the code including instructions and being stored in a memory (e.g., computer-readable medium). Receiver 1106 may be, for example, a radio frequency (RF) receiver. In an aspect, receiver 1106 may receive signals transmitted by at least one base station 102. Additionally, receiver 1106 may process such received signals, and also may obtain measurements of the signals, such as, but not limited to, Ec/Io, signal-to-noise ratio (SNR), reference signal received power (RSRP), received signal strength indicator (RSSI), etc. Transmitter 1108 may include hardware and/or software executable by a processor for transmitting data, the code including instructions and being stored in a memory (e.g., computer-readable medium). A suitable example of transmitter 1108 may include, but is not limited to, an RF transmitter.

Moreover, in an aspect, UE 104 may include RF front end 1188, which may operate in communication with one or more antennas 1165 and transceiver 1102 for receiving and transmitting radio transmissions, for example, wireless communications transmitted by at least one base station 102 or wireless transmissions transmitted by UE 104. The one or more antennas 1165 may include one or more antenna panels and/or sub-arrays, such as may be used for beamforming. RF front end 1188 may be connected to one or more antennas 1165 and can include one or more low-noise amplifiers (LNAs) 1190, one or more switches 1192, one or more power amplifiers (PAS) 1198, and one or more filters 1196 for transmitting and receiving RF signals.

In an aspect, LNA 1190 can amplify a received signal at a desired output level. In an aspect, each LNA 1190 may have a specified minimum and maximum gain values. In an aspect, RF front end 1188 may use one or more switches 1192 to select a particular LNA 1190 and its specified gain value based on a desired gain value for a particular application.

Further, for example, one or more PA(s) 1198 may be used by RF front end 1188 to amplify a signal for an RF output at a desired output power level. In an aspect, each PA 1198 may have specified minimum and maximum gain values. In an aspect, RF front end 1188 may use one or more switches 1192 to select a particular PA 1198 and its specified gain value based on a desired gain value for a particular application.

Also, for example, one or more filters 1196 can be used by RF front end 1188 to filter a received signal to obtain an input RF signal. Similarly, in an aspect, for example, a respective filter 1196 can be used to filter an output from a respective PA 1198 to produce an output signal for transmission. In an aspect, each filter 1196 can be connected to a specific LNA 1190 and/or PA 1198. In an aspect, RF front end 1188 can use one or more switches 1192 to select a transmit or receive path using a specified filter 1196, LNA 1190, and/or PA 1198, based on a configuration as specified by transceiver 1102 and/or processor 1112.

As such, transceiver 1102 may be configured to transmit and receive wireless signals through one or more antennas 1165 via RF front end 1188. In an aspect, transceiver may be tuned to operate at specified frequencies such that UE 104 can communicate with, for example, one or more base stations 102 or one or more cells associated with one or more base stations 102. In an aspect, for example, modem 1140 can configure transceiver 1102 to operate at a specified frequency and power level based on the UE configuration of the UE 104 and the communication protocol used by modem 1140.

In an aspect, modem 1140 can be a multiband-multimode modem, which can process digital data and communicate with transceiver 1102 such that the digital data is sent and received using transceiver 1102. In an aspect, modem 1140 can be multiband and be configured to support multiple frequency bands for a specific communications protocol. In an aspect, modem 1140 can be multimode and be configured to support multiple operating networks and communications protocols. In an aspect, modem 1140 can control one or more components of UE 104 (e.g., RF front end 1188, transceiver 1102) to enable transmission and/or reception of signals from the network based on a specified modem configuration. In an aspect, the modem configuration can be based on the mode of the modem and the frequency band in use. In another aspect, the modem configuration can be based on UE configuration information associated with UE 104 as provided by the network during cell selection and/or cell reselection.

In an aspect, the processor(s) 1112 may correspond to one or more of the processors described in connection with the UE in FIG. 3. Similarly, the memory 1116 may correspond to the memory described in connection with the UE in FIG. 3.

Figure 12:
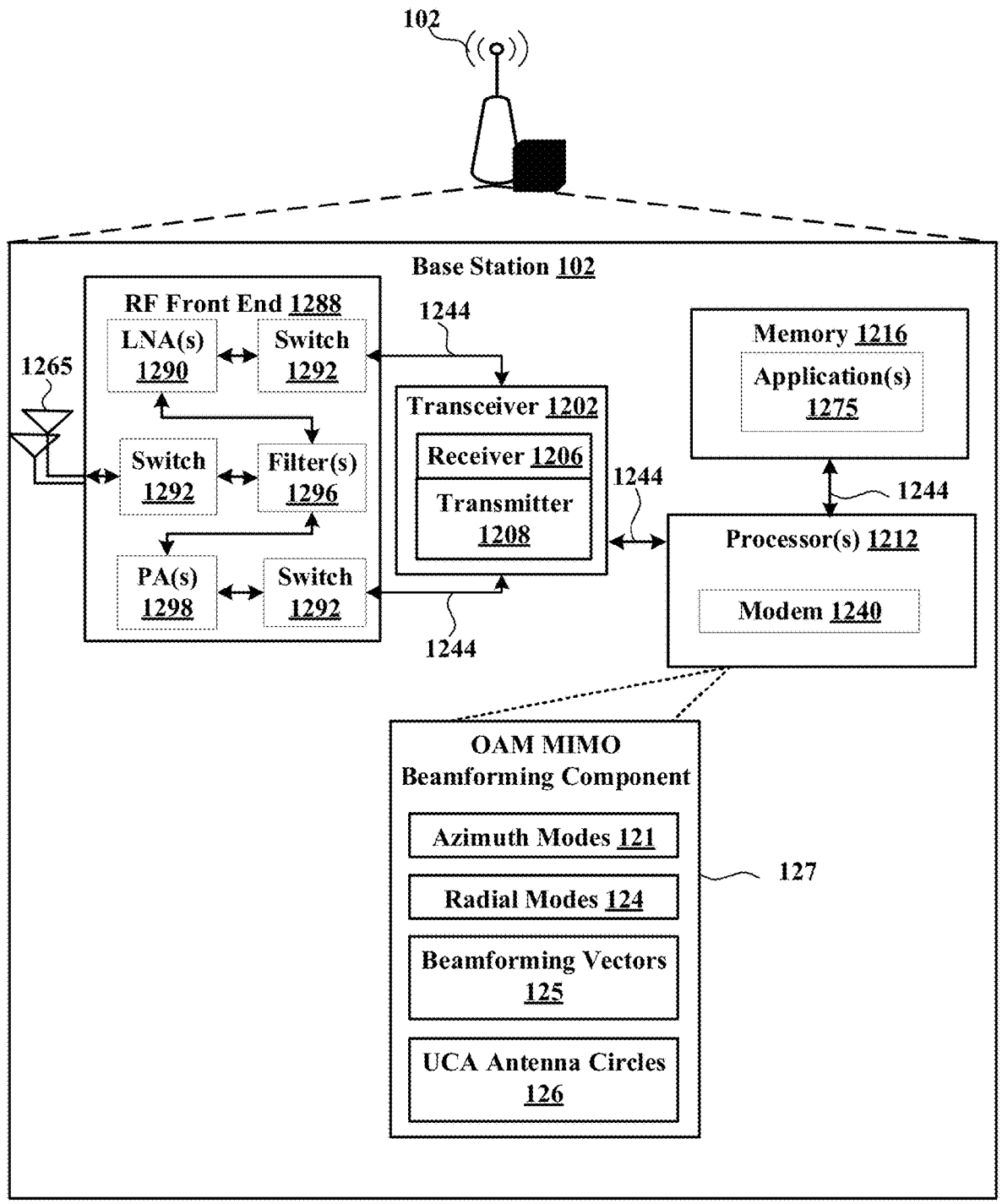
FIG. 12 is a block diagram of an example base station, according to some aspects of the present disclosure.

Referring to FIG. 12, one example of an implementation of base station 102 may include a variety of components, some of which have already been described above, but including components such as one or more processors 1212 and memory 1216 and transceiver 1202 in communication via one or more buses 1244, which may operate in conjunction with modem 1240 and/or OAM MIMO beamforming component 127 for performing OAM MIMO beamforming as described herein The transceiver 1202, receiver 1206, transmitter 1208, one or more processors 1212, memory 1216, applications 1275, buses 1244, RF front end 1288, LNAs 1290, switches 1292, filters 1296, PAs 1298, and one or more antennas 1265 may be the same as or similar to the corresponding components of UE 104, as described above, but configured or otherwise programmed for base station operations as opposed to UE operations.

In an aspect, the processor(s) 1212 may correspond to one or more of the processors described in connection with the base station in FIG. 3. Similarly, the memory 1216 may correspond to the memory described in connection with the base station in FIG. 3.

Some further aspects are provided below.

1. A method of orbital angular momentum "OAM" multiple-input multiple-output "MIMO" communication at a transmitter, comprising:
selecting, from a plurality of azimuth modes, an azimuth mode for an OAM MIMO transmission from the transmitter to a receiver, wherein the transmitter includes a first number of antenna circles that each include a second number of antenna elements, wherein the azimuth mode defines a discrete Fourier transform "DFT" vector of a first size less than or equal to the second number;
selecting, from a plurality of radial modes associated with the azimuth mode, a radial mode for the OAM MIMO transmission, wherein the plurality of radial modes includes at least a first radial mode defining a first beamforming vector and a second radial mode defining a second beamforming vector, wherein each one of the first beamforming vector and the second beamforming vector includes the DFT vector weighted and repeated for a number of times less than or equal to the first number, wherein the first beamforming vector and the second beamforming vector are orthogonal to each other; and
transmitting a signal by the transmitter to the receiver using an OAM MIMO beam that is configured according to the radial mode.

2. The method of clause 1, wherein the first number of antenna circles are concentric, wherein each circle in the first number of antenna circles comprises a uniform circular array "UCA" antenna circle.

3. The method of any of the above clauses, wherein each one of the first beamforming vector and the second beamforming vector is a Kronecker product of a weight vector and the DFT vector, wherein the weight vector has a second size less than or equal to the first number, wherein each weight in the weight vector is associated with a circle in the first number of antenna circles.

4. The method of any of the above clauses, wherein the receiver comprises a third number of antenna circles that each include a fourth number of antenna elements.

5. The method of any of the above clauses, wherein the first number of antenna circles and the third number of antenna circles are coaxial.

6. The method of any of the above clauses, wherein the weight vector is a singular vector of a matrix, wherein each element of the matrix comprises a singular value of a channel gain matrix between a pair of transmit-receive antenna circles of the transmitter and the receiver, wherein, for the singular value, the DFT vector is a corresponding singular vector of the channel gain matrix.

7. The method of any of the above clauses, wherein the first number is equal to the third number, wherein the second number is equal to the fourth number.

8. The method of any of the above clauses, wherein the weight vector is an eigenvector of a matrix, wherein each element of the matrix comprises an eigenvalue of a channel gain matrix between a pair of transmit-receive antenna circles of the transmitter and the receiver, wherein, for the eigenvalue, the DFT vector is a corresponding eigenvector of the channel gain matrix.

9. A method of orbital angular momentum "OAM" multiple-input multiple-output "MIMO" communication at a receiver, comprising:
selecting, from a plurality of azimuth modes, an azimuth mode for receiving an OAM MIMO transmission from a transmitter to the receiver, wherein the receiver includes a first number of antenna circles that each include a second number of antenna elements, wherein the azimuth mode defines a discrete Fourier transform "DFT" vector of a first size less than or equal to the second number;
selecting, from a plurality of radial modes associated with the azimuth mode, a radial mode for receiving the OAM MIMO transmission, wherein the plurality of radial modes includes at least a first radial mode defining a first beamforming vector and a second radial mode defining a second beamforming vector, wherein each one of the first beamforming vector and the second beamforming vector includes the DFT vector weighted and repeated for a number of times less than or equal to the first number, wherein the first beamforming vector and the second beamforming vector are orthogonal to each other; and
receiving a signal by the receiver from the transmitter using an OAM MIMO beam that is configured according to the radial mode.

10. The method of clauses 9, wherein the first number of antenna circles are concentric, wherein each circle in the first number of antenna circles comprises a uniform circular array "UCA" antenna circle.

11. The method of any of clauses 9 to 10, wherein each one of the first beamforming vector and the second beamforming vector is a Kronecker product of a weight vector and the DFT vector, wherein the weight vector has a second size less than or equal to the first number, wherein each weight in the weight vector is associated with a circle in the first number of antenna circles.

12. The method of any of clauses 9 to 11, wherein the transmitter comprises a third number of antenna circles that each include a fourth number of antenna elements.

13. The method of any of clauses 9 to 12, wherein the first number of antenna circles and the third number of antenna circles are coaxial.

14. The method of any of clauses 9 to 13, wherein the weight vector is a singular vector of a matrix, wherein each element of the matrix comprises a singular value of a channel gain matrix between a pair of transmit-receive antenna circles of the transmitter and the receiver, wherein, for the singular value, the DFT vector is a corresponding singular vector of the channel gain matrix.

15. The method of any of clauses 9 to 14, wherein the first number is equal to the third number, wherein the second number is equal to the fourth number.

16. The method of any of clauses 9 to 15, wherein the weight vector is an eigenvector of a matrix, wherein each element of the matrix comprises an eigenvalue of a channel gain matrix between a pair of transmit-receive antenna circles of the transmitter and the receiver, wherein, for the eigenvalue, the DFT vector is a corresponding eigenvector of the channel gain matrix.

An apparatus for comprising:
a memory; and
a processor coupled with the memory and configured to perform the method of any of the above clauses.

An apparatus comprising means for performing the method of any of the above clauses.

A computer-readable medium storing code that, when executed by a processor, causes the processor to perform the method of any of the above clauses.

It is understood that the specific order or hierarchy of blocks in the processes/flowcharts disclosed is an illustration of example approaches. Based upon design preferences, it is understood that the specific order or hierarchy of blocks in the processes/flowcharts may be rearranged. Further, some blocks may be combined or omitted. The accompanying method claims present elements of the various blocks in a sample order, and are not meant to be limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." The word "exemplary" is used herein to mean "serving as an example, instance, or illustration." Any aspect described herein as "exemplary" is not necessarily to be construed as preferred or advantageous over other aspects. Unless specifically stated otherwise, the term "some" refers to one or more. Combinations such as "at least one of A, B, or C," "one or more of A, B, or C," "at least one of A, B, and C," "one or more of A, B, and C," and "A, B, C, or any combination thereof" include any combination of A, B, and/or C, and may include multiples of A, multiples of B, or multiples of C. Specifically, combinations such as "at least one of A, B, or C," "one or more of A, B, or C," "at least one of A, B, and C," "one or more of A, B, and C," and "A, B, C, or any combination thereof" may be A only, B only, C only, A and B, A and C, B and C, or A and B and C, where any such combinations may contain one or more member or members of A, B, or C. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. The words "module," "mechanism," "element," "device," and the like may not be a substitute for the word "means." As such, no claim element is to be construed as a means plus function unless the element is expressly recited using the phrase "means for."

What is claimed is:

1. A method of orbital angular momentum "OAM" multiple-input multiple-output "MIMO" communication at a transmitter, comprising:
selecting, from a plurality of azimuth modes, an azimuth mode for an OAM MIMO transmission from the transmitter to a receiver, wherein the transmitter includes a first number of antenna circles that each include a second number of antenna elements, wherein the azimuth mode defines a discrete Fourier transform "DFT" vector of a first size less than or equal to the second number;
selecting, from a plurality of radial modes associated with the azimuth mode, a radial mode for the OAM MIMO transmission, wherein the plurality of radial modes includes at least a first radial mode defining a first beamforming vector and a second radial mode defining a second beamforming vector, wherein each one of the first beamforming vector and the second beamforming vector includes the DFT vector weighted and repeated for a number of times less than or equal to the first number, wherein the first beamforming vector and the second beamforming vector are orthogonal to each other; and
transmitting a signal by the transmitter to the receiver using an OAM MIMO beam that is configured according to the radial mode.

2. The method of claim 1, wherein the first number of antenna circles are concentric, wherein each circle in the first number of antenna circles comprises a uniform circular array "UCA" antenna circle.

3. The method of claim 1, wherein each one of the first beamforming vector and the second beamforming vector is a Kronecker product of a weight vector and the DFT vector, wherein the weight vector has a second size less than or equal to the first number, wherein each weight in the weight vector is associated with a circle in the first number of antenna circles.

4. The method of claim 3, wherein the receiver comprises a third number of antenna circles that each include a fourth number of antenna elements.

5. The method of claim 4, wherein the first number of antenna circles and the third number of antenna circles are coaxial.

6. The method of claim 4, wherein the weight vector is a singular vector of a matrix, wherein each element of the matrix comprises a singular value of a channel gain matrix between a pair of transmit-receive antenna circles of the transmitter and the receiver, wherein, for the singular value, the DFT vector is a corresponding singular vector of the channel gain matrix.

7. The method of claim 4, wherein the first number is equal to the third number, wherein the second number is equal to the fourth number, wherein the first size is equal to the second number, wherein the number of times is equal to the first number.

8. The method of claim 7, wherein the weight vector is an eigenvector of a matrix, wherein each element of the matrix comprises an eigenvalue of a channel gain matrix between a pair of transmit-receive antenna circles of the transmitter and the receiver, wherein, for the eigenvalue, the DFT vector is a corresponding eigenvector of the channel gain matrix.

9. A method of orbital angular momentum "OAM" multiple-input multiple-output "MIMO" communication at a receiver, comprising:
selecting, from a plurality of azimuth modes, an azimuth mode for receiving an OAM MIMO transmission from a transmitter to the receiver, wherein the receiver includes a first number of antenna circles that each include a second number of antenna elements, wherein the azimuth mode defines a discrete Fourier transform "DFT" vector of a first size less than or equal to the second number;
selecting, from a plurality of radial modes associated with the azimuth mode, a radial mode for receiving the OAM MIMO transmission, wherein the plurality of radial modes includes at least a first radial mode defining a first beamforming vector and a second radial mode defining a second beamforming vector, wherein each one of the first beamforming vector and the second beamforming vector includes the DFT vector weighted and repeated for a number of times less than or equal to the first number, wherein the first beamforming vector and the second beamforming vector are orthogonal to each other; and
receiving a signal by the receiver from the transmitter using an OAM MIMO beam that is configured according to the radial mode.

10. The method of claim 9, wherein the first number of antenna circles are concentric, wherein each circle in the first number of antenna circles comprises a uniform circular array "UCA" antenna circle.

11. The method of claim 9, wherein each one of the first beamforming vector and the second beamforming vector is a Kronecker product of a weight vector and the DFT vector, wherein the weight vector has a second size less than or equal to the first number, wherein each weight in the weight vector is associated with a circle in the first number of antenna circles.

12. The method of claim 11, wherein the transmitter comprises a third number of antenna circles that each include a fourth number of antenna elements.

13. The method of claim 12, wherein the first number of antenna circles and the third number of antenna circles are coaxial.

14. The method of claim 12, wherein the weight vector is a singular vector of a matrix, wherein each element of the matrix comprises a singular value of a channel gain matrix between a pair of transmit-receive antenna circles of the transmitter and the receiver, wherein, for the singular value, the DFT vector is a corresponding singular vector of the channel gain matrix.

15. The method of claim 12, wherein the first number is equal to the third number, wherein the second number is equal to the fourth number, wherein the first size is equal to the second number, wherein the number of times is equal to the first number.

16. The method of claim 15, wherein the weight vector is an eigenvector of a matrix, wherein each element of the matrix comprises an eigenvalue of a channel gain matrix between a pair of transmit-receive antenna circles of the transmitter and the receiver, wherein, for the eigenvalue, the DFT vector is a corresponding eigenvector of the channel gain matrix.

17. A transmitter apparatus for orbital angular momentum "OAM" multiple-input multiple-output "MIMO" communication, comprising:
a memory; and
a processor coupled with the memory and configured to:
select, from a plurality of azimuth modes, an azimuth mode for an OAM MIMO transmission from the transmitter apparatus to a receiver apparatus, wherein the transmitter apparatus includes a first number of antenna circles that each include a second number of antenna elements, wherein the azimuth mode defines a discrete Fourier transform "DFT" vector of a first size less than or equal to the second number;
select, from a plurality of radial modes associated with the azimuth mode, a radial mode for the OAM MIMO transmission, wherein the plurality of radial modes includes at least a first radial mode defining a first beamforming vector and a second radial mode defining a second beamforming vector, wherein each one of the first beamforming vector and the second beamforming vector includes the DFT vector weighted and repeated for a number of times less than or equal to the first number, wherein the first beamforming vector and the second beamforming vector are orthogonal to each other; and
transmit a signal by the transmitter apparatus to the receiver apparatus using an OAM MIMO beam that is configured according to the radial mode.

18. The transmitter apparatus of claim 17, wherein the first number of antenna circles are concentric, wherein each circle in the first number of antenna circles comprises a uniform circular array "UCA" antenna circle.

19. The transmitter apparatus of claim 17, wherein each one of the first beamforming vector and the second beamforming vector is a Kronecker product of a weight vector and the DFT vector, wherein the weight vector has a second size less than or equal to the first number, wherein each weight in the weight vector is associated with a circle in the first number of antenna circles.

20. The transmitter apparatus of claim 19, wherein the receiver apparatus comprises a third number of antenna circles that each include a fourth number of antenna elements.

21. The transmitter apparatus of claim 20, wherein the first number of antenna circles and the third number of antenna circles are coaxial.

22. The transmitter apparatus of claim 20, wherein the weight vector is a singular vector of a matrix, wherein each element of the matrix comprises a singular value of a channel gain matrix between a pair of transmit-receive antenna circles of the transmitter apparatus and the receiver apparatus, wherein, for the singular value, the DFT vector is a corresponding singular vector of the channel gain matrix.

23. The transmitter apparatus of claim 20, wherein the first number is equal to the third number, wherein the second number is equal to the fourth number, wherein the first size is equal to the second number, wherein the number of times is equal to the first number, wherein the weight vector is an eigenvector of a matrix, wherein each element of the matrix comprises an eigenvalue of a channel gain matrix between a pair of transmit-receive antenna circles of the transmitter apparatus and the receiver apparatus, wherein, for the eigenvalue, the DFT vector is a corresponding eigenvector of the channel gain matrix.

24. A receiver apparatus for orbital angular momentum "OAM" multiple-input multiple-output "MIMO" communication, comprising:
a memory; and
a processor coupled with the memory and configured to:
select, from a plurality of azimuth modes, an azimuth mode for receiving an OAM MIMO transmission from a transmitter apparatus to the receiver apparatus, wherein the receiver apparatus includes a first number of antenna circles that each include a second number of antenna elements, wherein the azimuth mode defines a discrete Fourier transform "DFT" vector of a first size less than or equal to the second number;
select, from a plurality of radial modes associated with the azimuth mode, a radial mode for receiving the OAM MIMO transmission, wherein the plurality of radial modes includes at least a first radial mode defining a first beamforming vector and a second radial mode defining a second beamforming vector, wherein each one of the first beamforming vector and the second beamforming vector includes the DFT vector weighted and repeated for a number of times less than or equal to the first number, wherein the first beamforming vector and the second beamforming vector are orthogonal to each other; and
receive a signal by the receiver apparatus from the transmitter apparatus using an OAM MIMO beam that is configured according to the radial mode.

25. The receiver apparatus of claim 24, wherein the first number of antenna circles are concentric, wherein each circle in the first number of antenna circles comprises a uniform circular array "UCA" antenna circle.

26. The receiver apparatus of claim 24, wherein each one of the first beamforming vector and the second beamforming vector is a Kronecker product of a weight vector and the DFT vector, wherein the weight vector has a second size less than or equal to the first number, wherein each weight in the weight vector is associated with a circle in the first number of antenna circles.

27. The receiver apparatus of claim 26, wherein the transmitter apparatus comprises a third number of antenna circles that each include a fourth number of antenna elements.

28. The receiver apparatus of claim 27, wherein the first number of antenna circles and the third number of antenna circles are coaxial.

29. The receiver apparatus of claim 27, wherein the weight vector is a singular vector of a matrix, wherein each element of the matrix comprises a singular value of a channel gain matrix between a pair of transmit-receive antenna circles of the transmitter apparatus and the receiver apparatus, wherein, for the singular value, the DFT vector is a corresponding singular vector of the channel gain matrix.

30. The receiver apparatus of claim 27, wherein the first number is equal to the third number, wherein the second number is equal to the fourth number, wherein the first size is equal to the second number, wherein the number of times is equal to the first number, wherein the weight vector is an eigenvector of a matrix, wherein each element of the matrix comprises an eigenvalue of a channel gain matrix between a pair of transmit-receive antenna circles of the transmitter apparatus and the receiver apparatus, wherein, for the eigenvalue, the DFT vector is a corresponding eigenvector of the channel gain matrix.

* * * * *